(12) United States Patent
Yuan et al.

(10) Patent No.: US 9,106,897 B2
(45) Date of Patent: Aug. 11, 2015

(54) PICTURE ENCODING AND DECODING METHOD, PICTURE ENCODING AND DECODING DEVICE AND NETWORK SYSTEM

(71) Applicants: Tsinghua University, Haidian, Beijing (CN); Huawei Technologies Co., Ltd., Shenzhen, Guangdong (CN)

(72) Inventors: Yuan Yuan, Beijing (CN); Xiaozhen Zheng, Shenzhen (CN); Lingzhi Liu, Shenzhen (CN); Yunfei Wang, Beijing (CN); Xiaoran Cao, Beijing (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 196 days.

(21) Appl. No.: 14/026,682

(22) Filed: Sep. 13, 2013

(65) Prior Publication Data

US 2014/0010469 A1 Jan. 9, 2014

Related U.S. Application Data

(63) Continuation of application No. PCT/CN2012/072464, filed on Mar. 16, 2012.

(30) Foreign Application Priority Data

Mar. 16, 2011 (CN) .......................... 2011 1 0063466
Jan. 30, 2012 (CN) .......................... 2012 1 0021060

(51) Int. Cl.
| | | |
|---|---|---|
| G06K 9/36 | (2006.01) |
| H04N 19/61 | (2014.01) |
| H04N 19/176 | (2014.01) |
| H04N 19/46 | (2014.01) |
| H04N 19/122 | (2014.01) |
| H04N 19/157 | (2014.01) |

(52) U.S. Cl.
CPC ....... *H04N 19/00781* (2013.01); *H04N 19/122* (2014.11); *H04N 19/157* (2014.11); *H04N 19/176* (2014.11); *H04N 19/46* (2014.11); *H04N 19/61* (2014.11)

(58) Field of Classification Search
USPC ........................................................ 382/232
See application file for complete search history.

(56) References Cited

U.S. PATENT DOCUMENTS

2012/0033731 A1 2/2012 Yamamoto et al.

FOREIGN PATENT DOCUMENTS

| CN | 101325714 A | 12/2008 |
|---|---|---|
| CN | 101350928 A | 1/2009 |
| CN | 101500160 A | 8/2009 |
| WO | WO 2010116869 A1 | 10/2010 |

OTHER PUBLICATIONS

Wiegand et al., "WD3: Working Draft 3 of High-Efficiency Video Coding," Document JCTVC-E603, Joint Collaborative Team on Video Coding (JCT-VC) of ITU-T SG16 WP3 and ISO/IEC JTC1/SC29/WG11, 5th Meeting: Geneva, CH (Mar. 2011).
International Search Report in corresponding PCT Patent Application No. PCT/CN2012/072464 (Jun. 14, 2012).

*Primary Examiner* — Duy M Dang
(74) *Attorney, Agent, or Firm* — Leydig, Voit & Mayer, Ltd.

(57) ABSTRACT

A picture encoding and decoding method, a picture encoding and decoding device and a network system are provided, in which, the picture encoding method includes: determining a prediction block used by a picture block according to a division manner of the picture block; determining a corresponding division level in the picture block or the prediction block of transform blocks corresponding to the picture block or the prediction block, in which, the transform blocks corresponding to the picture block or the prediction block include one or more transform blocks; determining a size of the transform blocks corresponding to the picture block or the prediction block according to the division manner of the picture block and the division level; determining identification information for identifying the division level corresponding to the transform blocks corresponding to the picture block or the prediction block; and writing the identification information into a code stream.

30 Claims, 20 Drawing Sheets

PICTURE ENCODING AND DECODING METHOD, PICTURE ENCODING AND DECODING DEVICE AND NETWORK SYSTEM

CROSS-REFERENCE TO RELATED APPLICATION

This application is a continuation of International Patent Application No. PCT/CN2012/072464, filed on Mar. 16, 2012, which claims priority to Chinese Patent Application No. 201110063466.2, filed on Mar. 16, 2011, and Chinese Patent Application No. 201210021060.2, filed on Jan. 30, 2012, all of which are hereby incorporated by reference in their entireties.

FIELD OF THE INVENTION

The present invention relates to the field of communications technologies, and in particular, to a picture encoding and decoding method, a picture encoding and decoding device and a network system.

BACKGROUND OF THE INVENTION

In order to reduce the bandwidth required for transferring video data as much as possible, various video compression methods may be adopted to compress the video data, in which the video compression methods include: intra-frame compression and inter-frame compression. Currently, an inter-frame compression method based on motion estimation is mostly adopted, and specifically, a procedure in which an encoding end of a picture adopts the inter-frame compression method to compress and encode the picture includes the following steps: the encoding end divides a picture block to be encoded into several sub-picture blocks with an equal size, then for each sub-picture block, a reference picture is searched for a picture block, the most matched with the current sub-picture block, to be used as a prediction block, then corresponding pixel values of the sub-picture block and the prediction block are subtracted to obtain a residual, and entropy encoding is performed on a value obtained by transforming and quantizing the residual, and finally a bit stream obtained through the entropy encoding, together with motion vector information, is sent to a decoding end, in which, the motion vector information indicates a position difference between the current sub-picture block and the prediction block. At the decoding end of the picture, first the bit stream is obtained through the entropy encoding, then entropy decoding is performed on the bit stream, to obtain the corresponding residual, and the corresponding motion vector information; and then according to the motion vector information, a corresponding matched picture block (that is, the foregoing prediction block) is obtained in the reference picture, and then a value of each pixel point in the matched picture block is added to a value of a corresponding pixel point in the residual value to obtain a value of each pixel point in the current sub-picture block.

In existing video encoding and decoding standards, such as the moving picture experts group (Moving Picture Experts Group, MPEG), and the H.264/AVC (Advanced Video Coding, advanced video coding), a picture block, or referred to as a macroblock (macroblock) or super-macroblock (super-macroblock), is divided into several sub-picture blocks, sizes of these sub-picture blocks are 16×16, 16×8, 8×16, 8×8, 8×4, 4×8, and 4×4, the foregoing motion estimation and motion compensation are performed on the sub-picture blocks with these sizes, and the encoding end of the picture is required to send a code word for identifying a picture block division manner to the decoding end of the picture, so that the decoding end of the picture knows a division manner of the picture encoding end, and determines a corresponding prediction block according to the division manner and the motion vector information. In the existing video encoding and decoding standards, these sub-picture blocks are all rectangular blocks of N×M (N and M are both integers greater than 0), and N and M has a multiple relationship.

Common manners for dividing a picture block into sub-picture blocks include: a 2N×2N division manner, in which a picture block only includes a sub-picture block, that is, the picture block is not divided into a smaller sub-picture block, as shown in FIG. 1a; a 2N×N division manner, in which a picture block is divided into an upper sub-picture block and a lower sub-picture block with an equal size, as shown in FIG. 1b; an N×2N division manner, in which a picture block is divided into a left sub-picture block and a right sub-picture block with an equal size, as shown in FIG. 1c; and an N×N division manner, in which a picture block is divided into four sub-picture blocks with an equal size, as shown in FIG. 1d. The N is any positive integer.

Moreover, a picture block may further adopt an asymmetrical division manner, as shown in FIG. 2a to FIG. 2d. In division manners shown in FIG. 2a and FIG. 2b, a picture block is divided into an upper rectangular sub-picture block and a lower rectangular sub-picture block with unequal sizes; In two sub-picture blocks into which 2N×nU (in which n=0.5 N) shown in FIG. 2a is divided, lengths of two sides of the upper sub-picture block is 2N and 0.5N, and lengths of two sides of the lower sub-picture block are 2N and 1.5N, in which, U in 2N×nU indicates that a picture division line is shifted up relative to a vertical bisector of the picture block, 2N×nU indicates that the picture division line is shifted up by n relative to the vertical bisector of the picture block, in which, n=x*N, where x is greater than or equal to 0 and less than or equal to 1; in two sub-picture blocks into which 2N×nD (in which n=0.5 N) shown in FIG. 2b is divided, lengths of two sides of the upper sub-picture block is 2N and 0.5N, and lengths of two sides of the lower sub-picture block are 2N and 1.5N, in which, D in 2N×nD indicates that a picture division line is shifted down relative to a vertical bisector of the picture block, 2N×nD indicates that the picture division line is shifted down by n relative to the vertical bisector of the picture block, in which, n=x*N, where x is greater than or equal to 0 and less than or equal to 1; in division manners shown in FIG. 2c and FIG. 2d, a picture block is divided into a left rectangular sub-picture block and a right rectangular sub-picture block with unequal sizes; in two sub-picture blocks into which nL×2N (in which n=0.5 N) shown in FIG. 2c is divided, lengths of two sides of the left sub-picture block are 0.5N and 2N, in which, L in nL×2N indicates that a picture division line is shifted left relative to a vertical bisector of the picture block, nL×2N indicates that the picture division line is shifted left by n relative to the vertical bisector of the picture block, in which, n=x*N, where x is greater than or equal to 0 and less than or equal to 1; lengths of two sides of the right sub-picture block are 1.5N and 2N; in two sub-picture blocks into which nR×2N (in which n=0.5 N) shown in FIG. 2d is divided, lengths of two sides of the left sub-picture block is 1.5N and 2N, and lengths of two sides of the right sub-picture block are 0.5N and 2N, in which, R in nR×2N indicates that a picture division line is shifted right relative to a vertical bisector of the picture block, nR×2N indicates that the picture division line is shifted right by n relative to the vertical bisector of the picture block, in which, n=x*N, where x is greater than or equal to 0 and less than or equal to 1.

In existing video encoding and decoding technologies, a transform matrix may be used to remove a correlation between residuals of a picture block, that is, remove redundant information of the picture block, so as to improve the encoding efficiency, and two-dimensional transform is generally adopted to transform a data block in the picture block, that is, at an encoding end, residual information of the data block is separately multiplied by an N×M transform matrix and a transposed matrix thereof, to obtain a transform coefficient after multiplication. The foregoing step may be described by using the following formula:

$$f = T' \times C \times T$$

where, C indicates residual information of a data block, T and T' indicate a transform matrix and a transposed matrix of the transform matrix, and f indicates a transform coefficient matrix obtained after the residual information of the data block is transformed. The transform matrix may be a discrete cosine transform (Discrete Cosine Transform, DCT) matrix, an integer transform (Integer Transform) matrix, or a KL transform (Karhunen Lòeve Transform, KLT) matrix. The KLT may better take a picture block or texture information of a residual of the picture block into account, and therefore the use of the KLT may achieve good effect.

Performing the foregoing processing on the residual information of the picture block is equivalent to converting the residual information of the picture block from a spatial domain into a frequency domain, and transform coefficient matrixes f obtained after the processing are focused on a low frequency area; after performing the foregoing transform on the residual information of the picture block, the encoding end performs processing such as quantization and entropy encoding on the transform coefficient matrix obtained after the transform, and then sends a bit stream obtained through the entropy encoding to the decoding end. In order to enable the decoding end to know the type and the size of the transform matrix adopted by the encoding end, generally, the encoding end sends indication information indicating the transform matrix used by the current picture block to the decoding end.

Subsequently, the decoding end determines the transform matrix adopted by the encoding end according to the indication information, and decodes the bit stream sent by the encoding end according to features of the transform matrix (such as, orthogonality of the transform matrix) to obtain the transform coefficient matrix, the transform coefficient matrix is multiplied by a transform matrix and a transposed matrix thereof, and residual information of a data block approximately consistent with that of the encoding end may be restored and obtained. The foregoing step may be described by using the following formula:

$$C = T \times f \times T'$$

where, C indicates residual information of a data block, T and T' indicate a transform matrix and a transposed matrix of the transform matrix, and f indicates a transform coefficient matrix obtained by the decoding end.

Because different distribution laws may exist for residuals of a picture block, and the use of a transform matrix with a particular size usually cannot achieve good transform effect, the prior art attempts to use transform matrixes (also referred to as transform blocks) with different sizes for the residuals of the picture block; therefore, for a 2N×2N picture block, a transform matrix with the size of 2N×2N may be used, and a transform matrix with the size of N×N or a transform matrix with the size of 0.5N×0.5N may be used. In order to effectively indicate how a picture block uses transform matrixes with different sizes, a tree form identifying method may be used. As shown in FIG. 3, when the transform size used by a picture block is identified, a first layer in a code stream has an indicator bit used for identifying whether the picture block uses a transform matrix with the size of 2N×2N, and if the picture block uses the transform matrix with the size of 2N×2N (as shown in FIG. 3a), the indicator bit is 0; if the 2N×2N transform is not used fro the picture block, the indicator bit is 1, which indicates that the transform matrix with the size of 2N×2N needs to be further divided into four transform matrixes with the size of N×N, and in a second layer structure of the code stream, four bits are used for separately identifying whether each transform matrix with the size of N×N is further divided; if the picture block uses the transform structure shown in FIG. 3b, the four bits are all 0, which indicates that each transform matrix with the size of N×N is not further divided anymore; when the transform structure shown in FIG. 3c is selected, in the four bits, two bits are 0, and two bits are 1, that two bits are 0 indicates that left lower and right upper transform matrixes with the size of N×N are not divided anymore; that two bits are 1 indicates that left upper and right lower transform matrixes with the size of N×N need to be further divided, to obtain transform matrixes with the size of 0.5N×0.5; and then in a third layer structure of the code stream, four bits are used to indicate whether a left upper transform matrix with the size of 0.5N× 0.5N needs to be further divided, four bits are used to indicate whether a right lower transform matrix with the size of 0.5N× 0.5N needs to be further divided, and if the picture block uses the transform structure shown in FIG. 3c, the foregoing four plus four bits are all 0, which indicates that division is not further performed anymore. Through the foregoing layer-wise identification in the code stream, the transform size used by the picture block and the sub-picture block may be effectively and flexibly indicated.

In the method of using layer-wise identification in the prior art, the size of a transform matrix is not associated with the size of a prediction block. As shown in FIG. 4a), when a 2N×2N picture block uses asymmetrical division (a division line is shown in the drawing as a bold solid line), if the current picture block uses a transform matrix with the size of 2N×2, the transform matrix crosses a boundary of a prediction block; if the current picture block uses four transform matrixes with the size of N×N, the transform matrixes still cross the boundary of the prediction block; if transform matrixes with the size of N×N are adopted on the left lower side and the right upper side of the current picture block, and transform matrixes with the size of 0.5N×0.5N are adopted on the left upper side and the right lower side of the current picture block, the transform matrix with the size of N×N on the left lower side of the current picture block still crosses the boundary of the prediction block.

The prior art has the following disadvantages:

In the prior art, the size of a transform matrix is not associated with the size of a prediction block, so that the transform matrix crosses the boundary of the prediction block. Because skipping transform exists in residual data corresponding to boundaries of two prediction blocks, if a transform matrix crosses the boundaries of two prediction blocks, the transform action is alleviated, the correlation between residuals of a picture block cannot be effectively removed, and the redundant information of the picture block cannot be effectively removed, thereby reducing the encoding efficiency.

SUMMARY OF THE INVENTION

Embodiments of the present invention provide a picture encoding and decoding method, a picture encoding and decoding device and a network system, which are capable of determining a size of a transform block according to a division manner of a picture block, thereby ensuring that the transform block does not cross a boundary of a prediction block.

Accordingly, embodiments of the present invention provide:

a picture encoding method, which includes:

determining a prediction block used by a picture block according to a division manner of the picture block;

determining a corresponding division level in the picture block or the prediction block of a transform block corresponding to the picture block or the prediction block, in which, the transform block corresponding to the picture block or the prediction block may be one or more transform blocks;

determining a size of the transform block corresponding to the picture block or the prediction block according to the division manner of the picture block and the division level;

determining identification information for identifying the division level corresponding to the transform block corresponding to the picture block or the prediction block; and writing the identification information into a code stream.

a picture decoding method, which includes:

obtaining a division manner of a picture block, and determining a prediction block used by the picture block according to the division manner of the picture block;

resolving a code stream to obtain identification information for identifying a division level in the picture block or the prediction block of a transform block corresponding to the picture block or the prediction block, and determining the corresponding division level in the picture block or the prediction block of the transform block corresponding to the picture block or the prediction block according to the identification information, in which, the transform block corresponding to the picture block or the prediction block may be one or more transform blocks; and determining a size of the transform block corresponding to the picture block or the prediction block according to the division manner of the picture block and the division level.

a picture encoding device, which includes:

a prediction block determining unit, configured to determine a prediction block used by a picture block according to a division manner of the picture block;

a division level determining unit, configured to determine a corresponding division level in the picture block or the prediction block of a transform block corresponding to the picture block or the prediction block, in which, the transform block corresponding to the picture block or the prediction block may be one or more transform blocks;

a transform block size determining unit, configured to determine a size of the transform block corresponding to the picture block or the prediction block according to the division manner of the picture block and the division level;

an identification information determining unit, configured to determine identification information for identifying the division level corresponding to the transform block corresponding to the picture block or the prediction block; and a writing unit, configured to write the identification information into a code stream.

a picture decoding device, which includes:

a prediction block determining unit, configured to obtain a division manner of a picture block, and determining a prediction block used by the picture block according to the division manner of the picture block;

an identification information obtaining unit, configured to resolve a code stream to obtain identification information for identifying a corresponding division level in the picture block or the prediction block of a transform block corresponding to the picture block or the prediction block;

a division level determining unit, configured to determine the corresponding division level in the picture block or the prediction block of the transform block corresponding to the picture block or the prediction block according to the identification information, in which, the transform block corresponding to the picture block or the prediction block may be one or more transform blocks; and a transform block size determining unit, configured to determine a size of the transform block corresponding to the picture block or the prediction block according to the division manner of the picture block and the division level.

In the embodiments of the present invention, when the size of the transform block is determined, the division manner of the picture block is taken into account, and the identification information for identifying the division level corresponding to the transform blocks corresponding to the picture block or the prediction block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

BRIEF DESCRIPTION OF THE DRAWINGS

In order to make the technical solution under the present invention clearer, the accompanying drawings for illustrating the embodiments of the present invention or the prior art are outlined below. Evidently, the accompanying drawings are for the exemplary purpose only, and those of ordinary skill in the art can derive other drawings from such accompanying drawings without any creative effort.

DETAILED DESCRIPTION OF THE EMBODIMENTS

Embodiment 1

Figure 1A:
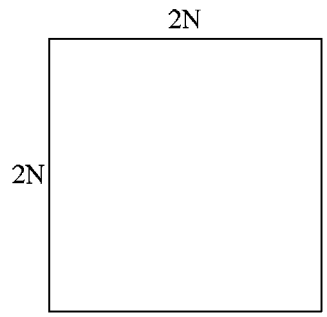
FIG. 1a is a schematic diagram of a division manner being 2N×2N.
Figure 1B:
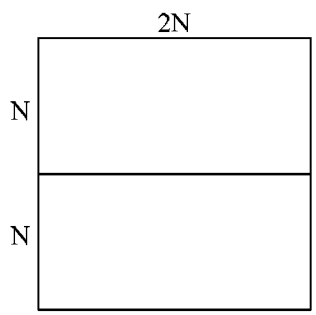
FIG. 1b is a schematic diagram of a division manner being 2N×N.
Figure 1C:
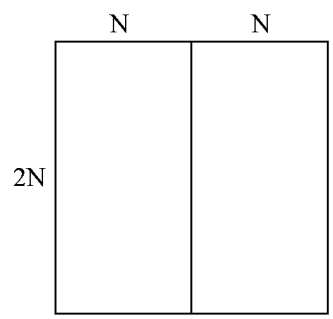
FIG. 1c is a schematic diagram of a division manner being N×2N.
Figure 1D:
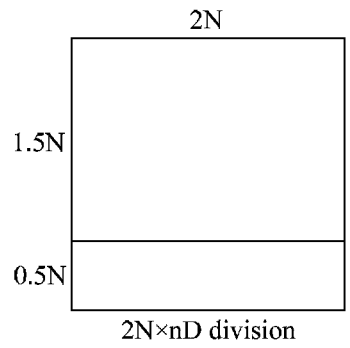
FIG. 1d is a schematic diagram of a division manner being N×N.
Figure 2A:
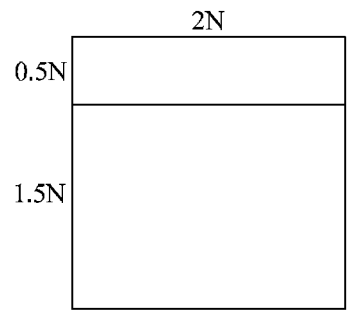
FIG. 2a is a schematic diagram of a division manner being 2N×nU.
Figure 2B:
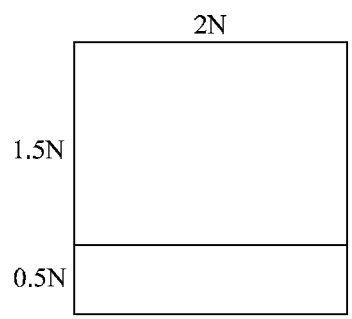
FIG. 2b is a schematic diagram of a division manner being 2N×nD.
Figure 2C:
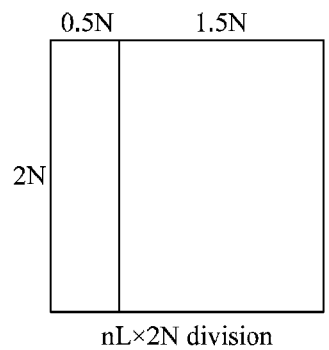
FIG. 2c is a schematic diagram of a division manner being nL×2N.
Figure 2D:
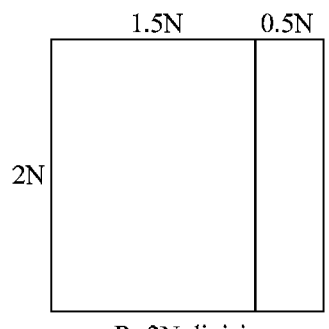
FIG. 2d is a schematic diagram of a division manner being nR×2N.
Figure 3A:
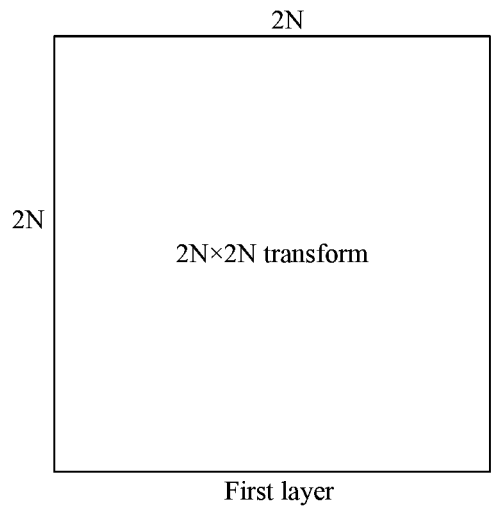
FIG. 3a is a schematic diagram showing that a picture block uses a transform block with the size of 2N×2N.
Figure 3B:
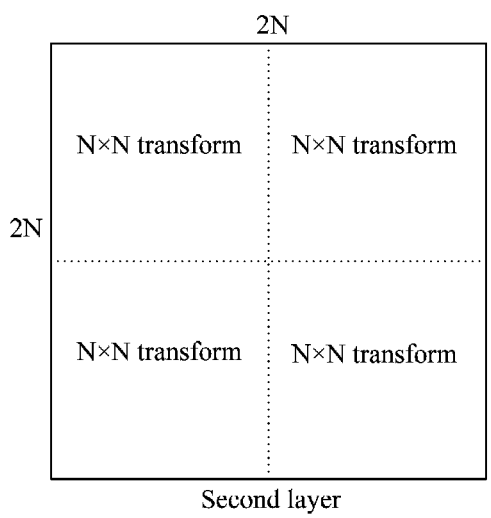
FIG. 3b is a schematic diagram showing that a picture block uses four transform blocks with the size of N×N.
Figure 3C:
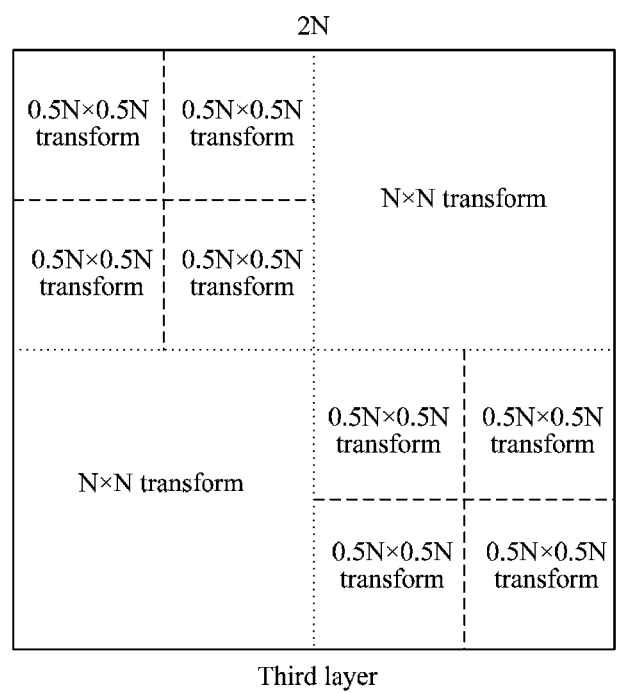
FIG. 3c is a schematic diagram showing that a picture block uses transform blocks with the size of N×N and transform blocks with the size of 0.5N×0.5N.
Figure 4A:
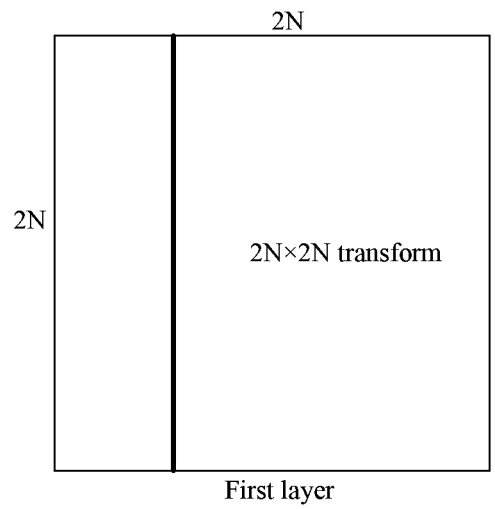
FIG. 4a is a schematic diagram showing that a picture block uses a transform block with the size of 2N×2N during asymmetrical division.
Figure 4B:
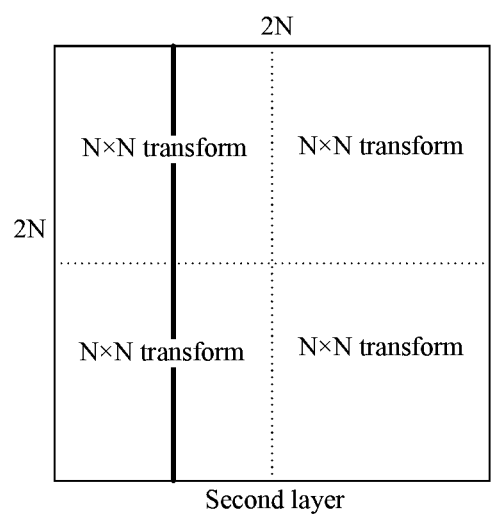
FIG. 4b is a schematic diagram showing that a picture block uses four transform blocks with the size of N×N during asymmetrical division.
Figure 4C:
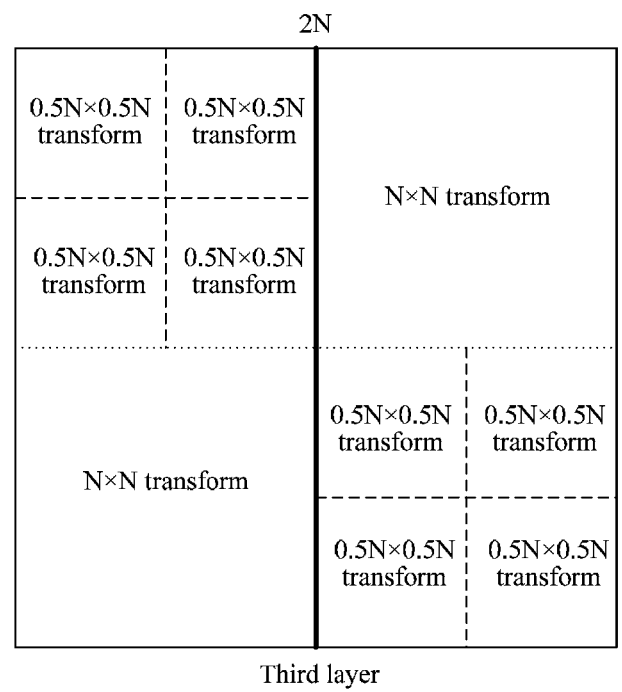
FIG. 4c is a schematic diagram showing that a picture block uses transform blocks with the size of N×N and transform blocks with the size of 0.5N×0.5N during asymmetrical division.
Figure 5:
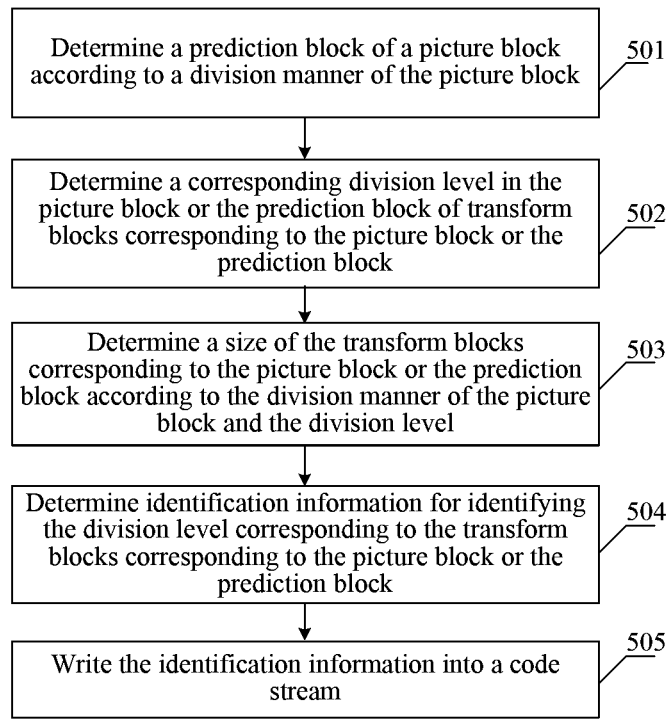
FIG. 5 is a flowchart of a picture encoding method according to embodiment 1 of the present invention.

Referring to FIG. 5, an embodiment of the present invention provides a picture encoding method, which specifically includes the following steps:

Step 501: Determine a prediction block used by a picture block according to a division manner of the picture block.

Each step of the embodiment may be executed by a picture encoding device.

The division manner of the picture block may be classified into: a division manner of nL×2N and a division manner of 2N×nL. The division manner of nL×2N belongs to vertical division, for example, a picture block is divided into a sub-picture block of 0.5N×2N and a sub-picture block 1.5N×2N; the division manner of 2N×nL belongs to horizontal division, for example, a picture block is divided into a sub-picture block of 2N×0.5N and a sub-picture block 2N×1.5N. In the step, the determining of the prediction block used by the picture block according to the division manner of the picture block specifically includes: determining a size of the prediction block used by the picture block according to the division manner of the picture block. The size of the prediction block is the same as the size of the sub-picture block obtained through division.

Step 502: Determine a corresponding division level in the picture block or the prediction block of a transform block corresponding to the picture block or the prediction block, in which, the transform block corresponding to the picture block or the prediction block could be one or more transform blocks.

In each embodiment of the present invention, a transform block corresponding to the picture block is a transform block adopted by the picture block; the transform block corresponding to the picture block is: a transform block adopted by a sub-picture block whose size matches the size of the prediction block. The division level corresponding to the transform block corresponding to the picture block or the prediction block in the picture block or the prediction block is a division level used by the transform block corresponding to the picture block or the prediction block in the picture block or the prediction block.

Step 503: Determine a size of the transform block corresponding to the picture block or the prediction block according to the division manner of the picture block and the division level. The division level is a division level corresponding to the transform block corresponding to the picture block or the prediction block.

When a corresponding division level in the picture block (or the prediction block) of at least one transform block corresponding to the picture block (or the prediction block) is the $N+1^{th}$ division layer, a horizontal size of the at least one transform block is less than a horizontal size of the transform block corresponding to the $N^{th}$ division layer; and/or a vertical size of the at least one transform block is less than a vertical size of the transform block corresponding to the $N^{th}$ division layer.

That the horizontal size of the at least one transform block is less than the horizontal size of the transform block corresponding to the $N^{th}$ division layer is that: the horizontal size of the at least one transform block is $1/m_1$ of the horizontal size of the transform block corresponding to the $N^{th}$ division layer, in which, $m_1$ is greater than or equal to 2; that the vertical size of the at least one transform block is less than the vertical size of the transform block corresponding to the $N^{th}$ division layer is that: the vertical size of the at least one transform block is $1/m_2$ of the vertical size of the transform block corresponding to the $N^{th}$ division layer, in which, $m_2$ is greater than or equal to 2. $m_1$ may be equal or unequal to $m_2$.

Step 504: Determine identification information for identifying the division level corresponding to the transform block corresponding to the picture block or the prediction block.

Specifically, when a corresponding division level in the picture block or the prediction block of a transform block corresponding to the picture block or the prediction block is a first division layer, the identification information for identifying the division level corresponding to the transform block corresponding to the picture block or the prediction block includes: a flag bit identifying that the transform block corresponding to the first division layer is not further divided; when a corresponding division level in the picture block or the prediction block of a transform block corresponding to the picture block or the prediction block is a second division layer, the identification information for identifying the division level corresponding to the transform block corresponding to the picture block or the prediction block includes: a flag bit identifying that the transform block corresponding to the first division layer is further divided, in which, the transform block corresponding to the picture block or the prediction block is a transform block obtained by further dividing the transform block of the first division layer; when a corresponding division level in the picture block or the prediction block of a transform block corresponding to the picture block or the prediction block is a third division layer, the identification information for identifying the division level corresponding to the transform block corresponding to the picture block or the prediction block includes: the flag bit identifying that the transform block corresponding to the first division layer is further divided, and a flag bit identifying that the transform block corresponding to the first division layer is further divided, in which, the transform block corresponding to the picture block or the prediction block is a transform block obtained by further dividing the transform block of the second division layer, and the transform block of the second division layer is a transform block obtained by further dividing the transform block of the first division layer.

Step 505: Write the identification information into a code stream.

Figure 6:
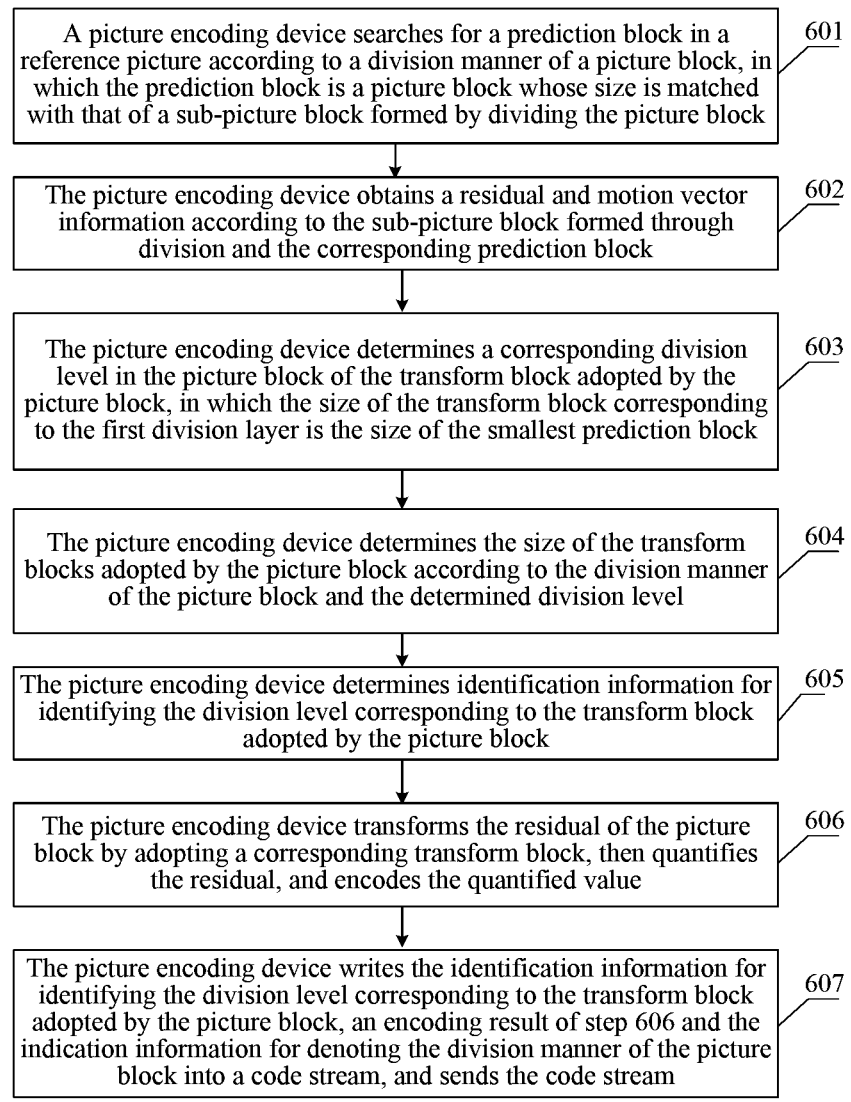
FIG. 6 is a flowchart of a picture encoding method according to embodiment 2 of the present invention.

Alternatively, in an implementation manner:

in step 502, a corresponding division level in the prediction block of a transform block corresponding to the prediction block may be determined; in step 503, the size of the transform blocks corresponding to the prediction block may be determined according to the division manner of the picture block and the determined division level, and for the specific implementation manner of the step, refer to the detailed description of a subsequent embodiment shown in FIG. 6, which is not repeated herein. It should be noted that, when the corresponding division level in the prediction block of the transform block corresponding to the determined prediction block is a first division layer, the size of the transform block is the size of a smallest prediction block. In step 504, the identification information for identifying the division level corresponding to the transform blocks corresponding to the prediction block may be determined; in step 504, the identification information for identifying the division level corresponding to the transform blocks corresponding to the prediction block may be written into the code stream. When the corresponding division level in the prediction block of the at least one transform block corresponding to the prediction block is an Nth division layer, it is determined that the identification information for identifying the division level corresponding to the at least one transform block corresponding to the prediction block includes: a flag bit identifying that the at least one transform block corresponding to the $N^{th}$ division layer not further divided; when the corresponding division level in the prediction block of the at least one transform block corresponding to the prediction block is greater than the $N^{th}$ division layer, it is determined that the identification information for identifying the division level corresponding to the at least one transform block corresponding to the prediction block includes: a flag bit for identifying that a transform block corresponding to the $N^{th}$ division layer is further divided, in which, a transform block corresponding to the $N^{th}$ division layer is a transform block of an upper level of the at least one transform block. N is an integer greater than 1, such as 1, 2, 3, 4, and 5. When a corresponding division level in the prediction block of a transform block corresponding to the prediction block is a particular division layer, a size of the transform block determined according to the division manner of the picture block and the particular division layer is a size of a smallest prediction block, in which, the smallest prediction block is a prediction block with a smallest size of the determined prediction blocks of the picture block. The particular division layer may be the first division layer.

Figure 7:
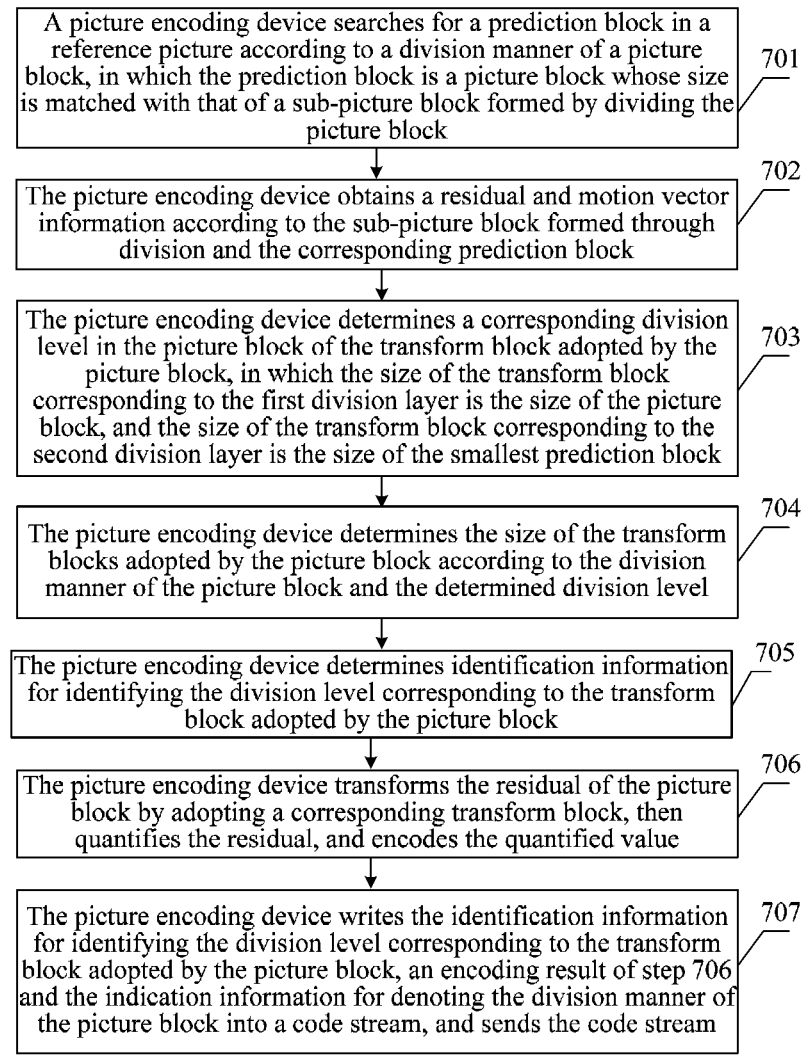
FIG. 7 is a flowchart of a picture encoding method according to embodiment 3 of the present invention.

Alternatively, in another implementation manner in step 502, a corresponding division level in the picture block of a transform block corresponding to the picture block is determined; in step 503, the size of the transform blocks corresponding to the picture block may be determined according to the division manner of the picture block and the determined division level, and for the specific implementation manner of the step, refer to the detailed description of a subsequent embodiment shown in FIG. 7, which is not repeated herein. It should be noted that, when the corresponding division level in the picture block of the determined transform block corresponding to the picture block is a first division layer, a size of the transform block determined according to the division manner of the picture block and the determined division level is a size of the picture block; when the corresponding division level in the picture block of the determined transform block corresponding to the picture block is a second division layer, a size of the transform block determined according to the division manner of the picture block and the determined division level is a size of a smallest prediction block. In step 504, the identification information for identifying the division level corresponding to the transform blocks corresponding to the picture block may be determined; in step 504, the identification information for identifying the division level corresponding to the transform blocks corresponding to the picture block may be written into the code stream. When the corresponding division level in the picture block of the at least one transform block corresponding to the picture block is an $N^{th}$ division layer, it is determined that the identification information for identifying the division level corresponding to the at least one transform block corresponding to the picture block includes: a flag bit identifying that the at least one transform block of the $N^{th}$ division layer is not further divided; when the corresponding division level in the picture block of the at least one transform block corresponding to the picture block is greater than the $N^{th}$ division layer, it is determined that the identification information for identifying the division level corresponding to the at least one transform block corresponding to the picture block includes: a flag bit for identifying that a transform block corresponding to the $N^{th}$ division layer is further divided, in which, N is an integer greater than 1, such as 1, 2, 3, 4, and 5. A transform block corresponding to the $N^{th}$ division layer is a transform block of an upper level of the at least one transform block. When a corresponding division level in the picture block of a transform block corresponding to the picture block is a first particular division layer, a size of the transform block determined according to the division manner of the picture block and the first particular division layer is a size of the picture block; and when the corresponding division level in the picture block of the transform block corresponding to the picture block is a second particular division layer, a size of the transform block determined according to the division manner of the picture block and the second particular division layer is a size of a smallest prediction block, in which, the smallest prediction block is a prediction block with a smallest size of prediction blocks of the determined picture block. The second particular division layer is a division level of a lower level of the first particular division layer, in which, the first particular division level may be the first division layer, and the second particular division layer may be the second division layer.

The smallest prediction block is a prediction block with a smallest size among the determined prediction blocks used by the picture block, that is, the smallest prediction block is a prediction block with the smallest horizontal size and/or vertical size of prediction blocks used by the picture block.

In the embodiment of the present invention, when the size of the transform block is determined, the division manner of the picture block is taken into account, and the identification information for identifying the division level corresponding to the transform blocks corresponding to the picture block or the prediction block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Embodiment 2

In order to make the foregoing technical solution provided by the present invention clearer, the following two embodiments introduce the foregoing technical solution of the present invention in detail.

Referring to FIG. 6, an embodiment of the present invention provides a picture encoding method, the method determines a division level where a transform block adopted by a picture block is located and a specific size of the transform block adopted by the picture block, and the method includes the following steps:

Step 601: A picture encoding device searches for a prediction block in a reference picture according to a division manner of a picture block, in which the prediction block is a picture block whose size matches the size of a sub-picture block obtained by dividing the picture block.

Size matching in each embodiment of the present invention may be that sizes are the same, or a size difference is within a predetermined range.

Step 602: The picture encoding device obtains a residual and motion vector information according to the sub-picture block obtained through division and the corresponding prediction block.

The residual is a difference between a pixel value of the sub-picture block obtained through division and a pixel value of a corresponding pixel point of the prediction block, such as, a difference between a luminance value of a corresponding pixel point of the sub-picture block obtained through division and a luminance value of a corresponding pixel point of the prediction block, or a difference between a chrominance value of a pixel point of the sub-picture block obtained through division and a chrominance value of a corresponding pixel point of the prediction block. The motion vector information indicates a position difference between the sub-picture block obtained through division and the prediction block.

Step 603: The picture encoding device determines a corresponding division level in the picture block of the transform block adopted by the picture block, in which the size of the transform block corresponding to the first division layer is the size of a smallest prediction block.

In a video encoding method, when various implementation methods exist for the picture encoding device, generally a traversal method is adopt to obtain an optimal encoding manner. That is, in each embodiment for describing picture encoding of the present invention, the picture encoding device may traverse various available division levels, and determine which division level may be used to make the transform effect the best, in which, the size of the transform block corresponding to the first division layer is the size of the smallest prediction block.

Step 604: The picture encoding device determines the size of the transform block adopted by the picture block according to the division manner of the picture block and the determined division level.

Figure 6A:
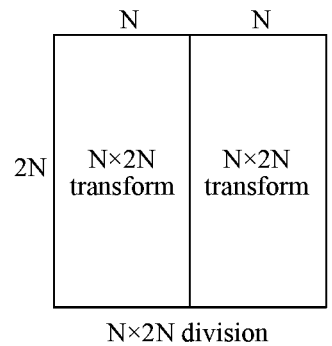
FIG. 6a is a schematic diagram showing that a picture block uses a transform block with the size of N×2N.

For example, when the division manner corresponding to the picture block is N×2N division, the picture block is divided into two sub-picture blocks with the size of N×2N, and in this case, the size of the prediction block is N×2N. In this case, as shown in FIG. 6a, if in step 603, it is determined that the transform effect may be very good if the picture block adopts the first division layer, it is determined, according to the division manner of the picture block that, in the method for identifying a transform size layer by layer, the transform size corresponding to the first division layer is N×2N, that is, the picture block is divided into two data blocks of N×2N, and each block separately uses a transform block of N×2N. As shown in FIG. 6c, when a second data block that is with the size of N×2N and is of the picture block needs to use a transform block that is to be further divided, that is, needs to use a transform block of the second division layer, the size of a transform block obtained by further dividing this transform block of N×2N is determined according to the division manner of the picture block and the division level, that is, the transform block of the first division layer (that is, the transform block with the size of N×2N) is further divided to obtain the size of the transform block of the second division layer; in this case, the horizontal size corresponding to a transform block of a next layer is the same as the horizontal size of the transform block corresponding to a current layer, and the vertical size corresponding to the transform block of the next layer is one half of the vertical size of the transform block corresponding to the current layer, that is, in this case, the size of the transform block is N×N, the transform block of the next layer is the second division layer, and the current layer is the first division layer.

Figure 6B:
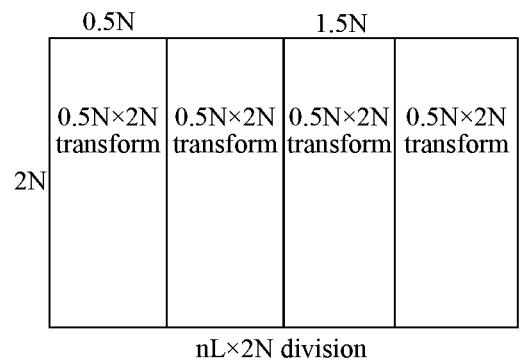
FIG. 6b is a schematic diagram showing that a picture block uses a transform block with the size of 0.5N×2N.
Figure 6C:
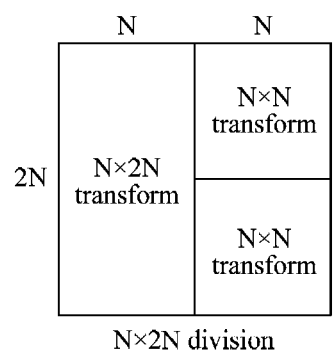
FIG. 6c is a schematic diagram showing that a picture block uses transform blocks with the sizes being N×2N and N×N.

Further, as shown in FIG. 6b, when the division manner adopted by the picture block is nL×2N division, it is assumed that the picture block is divided into two sub-picture blocks whose sizes are 0.5N×2N and 1.5N×2N, respectively, and in this case, sizes of prediction blocks corresponding to these two sub-picture blocks are 0.5N×2N and 1.5N×2N, respectively. In this case, if it is determined that the transform effect may be very good if the picture block adopts the transform block of the first division layer, it is determined, according to the division manner of the picture block that, in the method for identifying a transform size layer by layer, the transform size corresponding to the first division layer is consistent with the size of the smallest prediction block of the foregoing prediction blocks, that is, the size of the transform block is 0.5N×2N, the picture block is divided into four data blocks of 0.5×2N, and each data block separately uses the transform of 0.5×2N. The transform structure adopted by the nL×2N division manner is consistent with that of nL×2N. In this case, it may be ensured that the transform size does not exceed the prediction block, that is, the transform does not cross the boundary of the prediction block, thereby ensuring the transform efficiency. If it is determined that the transform effect may be very good if the picture block adopts the transform block of the first division layer. As further shown in FIG. 6d, when a second data block that is with the size of 0.5N×2N and is of the picture block needs to use a transform block that is to be further divided, that is, needs to use a transform block of the second division layer, the size of a transform block obtained by further dividing this transform block of 0.5N×2N is determined according to the division manner of the picture block and the division level, that is, the transform block of the first division layer (that is, the transform block with the size of 0.5N×2N) is further divided to obtain the size of the transform block of the second division layer; in this case, the horizontal size corresponding to a transform block of a next layer is the same as the horizontal size of the transform block corresponding to a current layer, and the vertical size corresponding to the transform block of the next layer is one half of the vertical size of the transform block corresponding to the current layer, and in this case, the size of the transform block is 0.5N×0.5N, the transform block of the next layer is the second division layer, and the current layer is the first division layer. Other data blocks without adopting the transform block that is further divided still adopt 0.5N×2N transform.

When the picture block is divided into two or more sub-picture blocks along a horizontal direction by adopting a horizontal division manner, such as 2N×N, 2N×nU, 2N×nD, N×2N, and nR×N, the manner for determining the transform structure adopted by the picture block is the same as that in the aforementioned description.

In the foregoing encoding procedure, a division level allowed under a certain division manner or the smallest transform size allowed under a certain division manner may be predetermined, in which, the division level allowed under a certain division manner is the most available division level under the division manner, the most available division level may be preset in an encoding and decoding system, for example, a picture encoding device and a picture decoding device preset that two-layer division may be used at most; or, the picture encoding device may also write indication information for identifying the most available division level into a code stream, so as to notify the picture decoding device of the most available division level; the smallest transform size allowed under a certain division manner is the transform block size corresponding to the highest division level allowed under the division manner, that is, the smallest transform block size is set in the picture encoding device and the picture decoding device, for example, in the picture encoding device and the picture decoding device, it is preset that the smallest transform block size allowed under the division mode of an N×2N picture block is N×N, and it is preset that the smallest transform block size allowed under the division mode of an nL×2N picture block is 0.5N×0.5N; or, the picture encoding device writes indication information for identifying the allowed smallest transform block size into a code stream, so as to notify the picture decoding device of the smallest transform block size which is allowed to be used, for example, indication information for identifying that the allowed smallest transform block size under the division mode of an N×2N picture block is N×N is written into a code stream, and indication information for identifying that the allowed smallest transform block size under the division mode of an nL×2N picture block is 0.5N×0.5N is written into a code stream.

Step 605: The picture encoding device determines identification information for identifying the division level corresponding to the transform block adopted by the picture block.

Specifically, for FIG. 6a, it is determined that the identification information for identifying the division level corresponding to the transform blocks corresponding to the picture block includes: two bits, in which values of the bits are both a first specified value, such as 1, which is used for indicating that the N×2N transform block corresponding to the first division layer is not further divided; for FIG. 6c, it is determined that the identification information for identifying the division level corresponding to the transform blocks corresponding to the picture block includes: two bits, in which a value of a bit corresponding to a left N×2N block is a first specified value, such as 1, which is used for indicating that the N×2N transform block corresponding to the first division layer is not further divided, a value of a bit corresponding to a right N×2N block is a second specified value, such as 0, which is used for indicating that the N×2N transform block corresponding to the first division layer needs to be further divided.

Figure 6D:
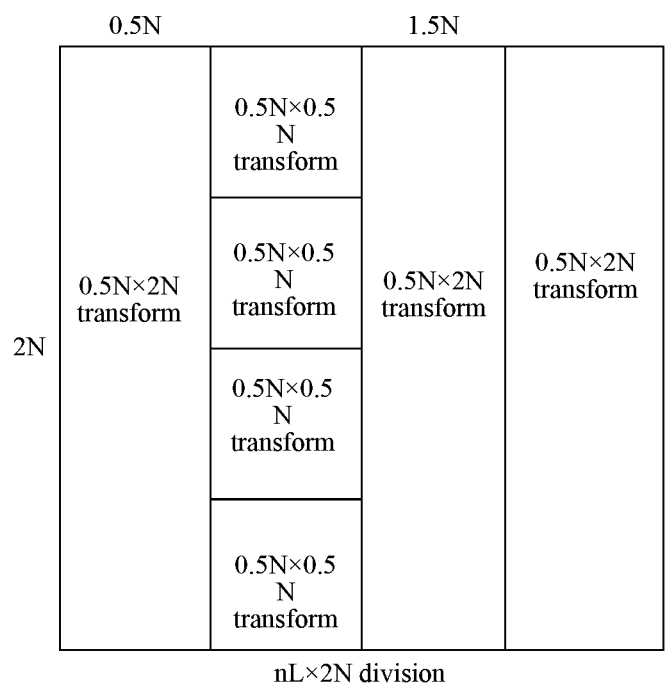
FIG. 6d is a schematic diagram showing that a picture block uses transform blocks with the sizes being 0.5×2N and 0.5N×0.5N.

Specifically, as shown in FIG. 6b, it is determined that the identification information for identifying the division level corresponding to the transform blocks corresponding to the picture block includes: four bits, in which values of the bits are all a first specified value, such as 1, which is used for indicating that the 0.5N×2N transform block corresponding to the first division layer is not further divided; for FIG. 6d, it is determined that the identification information for identifying the division level corresponding to the transform blocks corresponding to the picture block includes: four bits, in which values of bits corresponding to the first, the third and the fourth 0.5N×2N transform blocks are a first specified value, such as 1, which is used for indicating that the three 0.5N×2N transform blocks are not further divided, and a value of a bit corresponding to the second 0.5N×2N transform block is a second specified value, such as 0, which is used for indicating that this 0.5N×2N transform block needs to be further divided.

Step 606: The picture encoding device transforms the residual of the picture block by adopting a corresponding transform block, then quantizes the residual, and encodes the quantized value.

Step 607: The picture encoding device writes the identification information for identifying the division level corresponding to the transform block corresponding to the prediction block, an encoding result of step 606 and the indication information for indicating the division manner of the picture block into a code stream, and sends the code stream.

In the embodiment of the present invention, when the size of the transform block adopted by the picture block is determined, the division manner of the picture block is taken into account, and the identification information for identifying the division level where the transform block adopted by the picture block is located is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Embodiment 3

Referring to FIG. 7, an embodiment of the present invention provides another picture encoding method, and in the embodiment, in view of that when a residual value obtained at the time of predicting two sub-picture blocks obtained by dividing a picture block is small, the skipping phenomenon of boundaries of these two sub-picture blocks is not apparent, and in this case, even if a transform block adopted by a picture crosses a boundary of a sub-picture block, the transform efficiency does not deteriorate apparently, and because the number of encoding bits required for identifying transform of a larger size is less than that required for identifying transform of a small size, in this case, if the picture block adopts transform of a larger size, the effect may be better. In this embodiment, the transform of a larger size is combined with the transform of a larger size by using a layer-wise identification method, and the embodiment specifically includes the following steps:

Steps 701 to 702 are the same as steps 601 to 602, which are not repeated herein.

Step 703: The picture encoding device determines a corresponding division level in the picture block of the transform block adopted by the picture block.

The specific implementation manner of the step is similar to that of step 603, and the difference lies in that, the size of the transform block corresponding to the first division layer is the size of the picture block, that is, 2N×2N; the size of the transform block corresponding to the second division layer is the size of a smallest prediction block.

Step 704: The picture encoding device determines the size of the transform blocks adopted by the picture block according to the division manner of the picture block and the determined division level.

Specifically, the determining of the size of the transform blocks adopted by the picture block according to the division manner of the picture block and the determined division level is similar to step 604, and the difference lies in that, in the embodiment, the size of the transform block corresponding to the first division layer is 2N×2N, and in the embodiment, the size of the transform block corresponding to the second division layer is equivalent to the size of the transform block corresponding to the first division layer in the foregoing embodiment; and in the embodiment, the size of the transform block corresponding to the third division layer is equivalent to the size of the transform block corresponding to the second division layer in the foregoing embodiment, and the rest may be deduced by analogy.

Figure 7A:
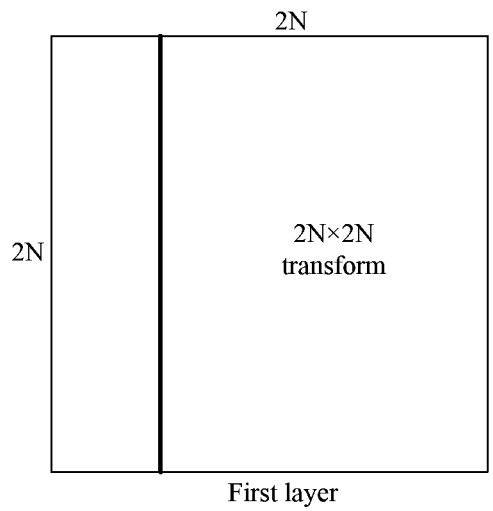
FIG. 7a is a schematic diagram showing that a picture block uses a transform block with the size of 2N×2N.

For example, when the picture block adopts the division manner of nL×2N, as shown in FIG. 7a, if it is determined in step 703 that the transform effect may be very good if the transform block of 2N×2N is adopted, in this case, the size of the transform block corresponding to the first division layer of the picture block is 2N×2N, and in this case, the transform block may cross the boundary of the sub-picture block; when the picture encoding device determines that the transform block of the second division layer is adopted, it is determined, according to the division manner of the picture block and the division level that, the size of the transform block of the second division layer used by the picture block is 0.5N×2N, and in this case, the picture block is divided into four data blocks of 0.5N×2N, and each block uses a transform block of 0.5N×2N, as shown in FIG. 6b. As shown in FIG. 6c, when the first and the fourth 0.5×2N data blocks need to use the transform block that is further divided, in this case, it is determined, according to the division manner of the picture block and the division level where the transform block is located, that the horizontal size of transform blocks obtained by further dividing these two 0.5N×2N transform blocks is consistent with the horizontal size of the transform block corresponding to the second division layer, and the vertical size is one fourth of the vertical size of the transform block corresponding to the second division layer, and in this case, the first and the fourth 0.5×2N data blocks are divided into four 0.5N× 0.5N blocks, and each block uses a 0.5N×0.5N transform block.

Step 705: The picture encoding device determines identification information for identifying the division level where the transform block adopted by the picture block is located.

Figure 7B:
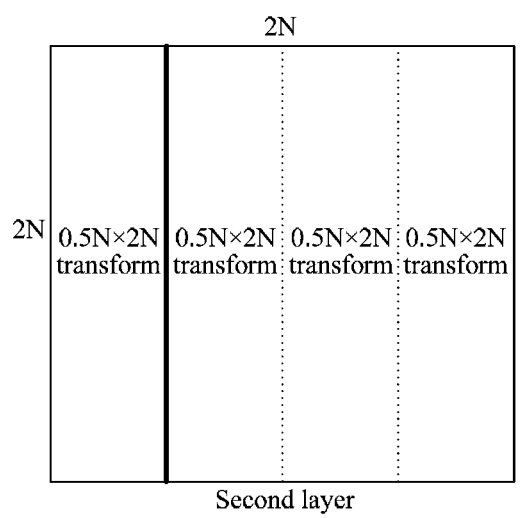
FIG. 7b is a schematic diagram showing that a picture block uses a transform block with the size of 0.5N×2N.
Figure 7C:
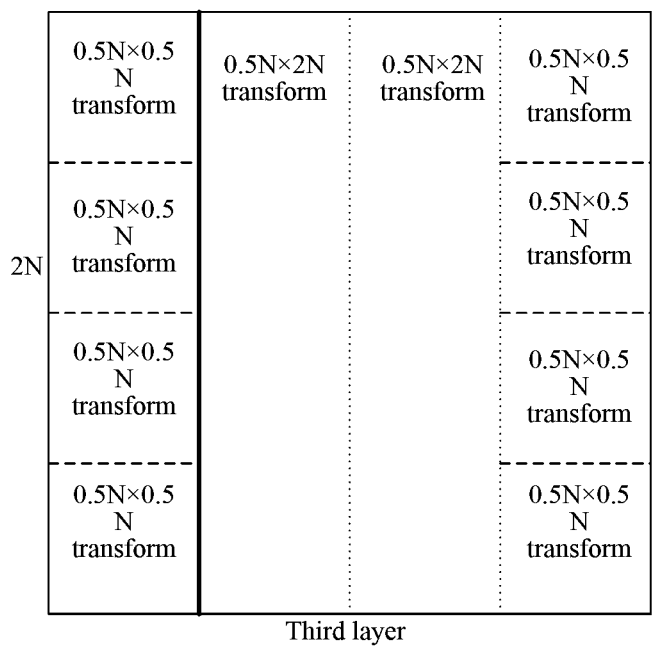
FIG. 7c is a schematic diagram showing that a picture block uses transform blocks with the sizes being 0.5N×2N and 0.5N×0.5N.

Specifically, for FIG. 7a, it is determined that the identification information for identifying the division level corresponding to each transform block corresponding to the prediction block includes: one bit, a value of which is a first specified value, such as 1, which is used for indicating that the transform block (that is, 2N×2N transform block) corresponding to the first division layer is not further divided; for FIG. 7b, the identification information for identifying the division level corresponding to each transform block corresponding to the prediction block includes: two layers of indication information, in which a first layer of indication information includes one bit, a value of which is a second specified value, such as 0, which is used for indicating that the transform block (that is, 2N×2N transform block) corresponding to the first division layer needs to be further divided, so as to obtain four transform blocks of the second division layer; a second layer of indication information includes four bits, values of which are separately 1, which indicates that four transform blocks of the second division layer do not need to be further divided; for FIG. 7c, the identification information for identifying the division level corresponding to each transform block corresponding to the prediction block at least includes: two layers of indication information, in which a first layer of indication information includes one bit, a value of which is a second specified value, such as 0, which is used for indicating that the transform block (that is, 2N×2N transform block) corresponding to the first division layer needs to be further divided, so as to obtain four transform blocks (that is, 0.5N×2N transform blocks) of the second division layer; a second layer of indication information includes four bits, in which values of the second and third bits are 1, which indicates that two transform blocks in the middle of the drawing do not need to be further divided; values of the first and fourth bits are 0, which indicates that two transform blocks at two sides in the drawing need to be further divided, so as to obtain four transform blocks of the third division layer (that is, 0.5N×0.5N transform blocks). In this case, a division level allowed under a predetermined nL×2N picture block division manner is 3, or the smallest transform block size allowed under a predetermined nL×2N picture block division manner is 0.5N×0.5N, the identification information for identifying the division level corresponding to the transform block corresponding to the prediction block includes only two layers of indication information; otherwise, the identification information further includes a third layer of indication information, in which the third layer of indication information is used for indicating whether four transform blocks of the third division layer need to be further divided.

Step 706: The picture encoding device transforms the residual of the picture block by adopting a corresponding transform block, then quantizes the residual, and encodes the quantized value.

Step 707: The picture encoding device writes the identification information for identifying the division level where the transform block adopted by the picture block is located, an encoding result of step 706 and the indication information for indicating the division manner of the picture block into a code stream, and sends the code stream.

In the embodiment of the present invention, when the size of the transform block adopted by the picture block is determined, the division manner of the picture block is taken into account, and the identification information for identifying the division level where the transform block adopted by the picture block is located is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Embodiment 4

The following specifically describes that, according to a picture block division manner and a division level corresponding to a transform block corresponding to a picture block or prediction block, the size of the corresponding transform block is obtained in a table lookup manner First manner: By using a preset mapping between the size of the transform block and both of the picture block division manner and the division level, the size of the transform block corresponding to the division manner of the picture block and the division level is determined. The division level is a division level corresponding to the transform blocks corresponding to the picture block or the prediction block, and the following Table 1 shows the mapping between the size of the transform block and both of the picture block division manner and the division level.

TABLE 1

| Division level | Division mode of an N × 2N picture block | Division mode of an nL × 2N picture block |
| --- | --- | --- |
| First layer | N × 2N | 0.5N × 2N |
| Second layer | N × N | 0.5N × 0.5N |

Second manner: By using a preset mapping between a first type of size ratio and both of the picture block division manner and the division level, the first type of size ratio corresponding to the division manner of the picture block and the division level is determined, in which, the division level is the division level corresponding to the transform blocks corresponding to the picture block or the prediction block, and then according to the determined first type of size ratio and the size of the picture block, the size of the transform block corresponding to the picture block or the prediction block is determined, in which, the first type of size ratio includes: a ratio of a horizontal size of the transform blocks corresponding to the picture block or the prediction block to a horizontal size of the picture block and a ratio of a vertical size of the transform blocks corresponding to the picture block or the prediction block to a vertical size of the picture block; the following Table 2 shows the mapping between a ratio of the horizontal size of the transform block to the horizontal size of the picture block and both of the picture block division manner and the division level, and the following Table 3 shows the mapping between a ratio of the vertical size of the transform block to the vertical size of the picture block and both of the picture block division manner and the division level.

TABLE 2

| Division level | Division mode of an N × 2N picture block | Division mode of an nL × 2N picture block |
| --- | --- | --- |
| First layer | 0.5 | 0.25 |
| Second layer | 0.5 | 0.25 |

TABLE 3

| Division level | Division mode of an N × 2N picture block | Division mode of an nL × 2N picture block |
| --- | --- | --- |
| First layer | 1 | 1 |
| Second layer | 0.5 | 0.25 |

Third manner: By using a preset mapping between a second type of size ratio and both of the picture block division manner and the division level, the second type of size ratio corresponding to the division manner of the picture block and the division level is determined, in which, the division level is the division level corresponding to the transform blocks corresponding to the picture block or the prediction block, and then according to the determined second type of size ratio and the size of the prediction block, the size of the transform block corresponding to the picture block or the prediction block is determined, in which, the second type of size ratio includes: a ratio of a horizontal size of the transform blocks corresponding to the picture block or the prediction block to a horizontal size of the prediction block and a ratio of a vertical size of the transform blocks corresponding to the picture block or the prediction block to a vertical size of the prediction block; in a specific implementation manner, the second type of size ratio specifically may include: a ratio of a horizontal size of the transform blocks corresponding to the picture block or the prediction block to a horizontal size of a smallest prediction block and a ratio of a vertical size of the transform blocks corresponding to the picture block or the prediction block to a vertical size of the smallest prediction block; and then according to the determined second type of size ratio and the size of the smallest prediction block, the size of the transform block corresponding to the picture block or the prediction block is determined. Table 4 shows the mapping between a ratio of the horizontal size of the transform block to the horizontal size of the smallest prediction block and both of the picture block division manner and the division level, and Table 5 shows the mapping between a ratio of the vertical size of the transform block to the vertical size of the smallest prediction block and both of the picture block division manner and the division level.

TABLE 4

| Division level | Division mode of an N × 2N picture block | Division mode of an nL × 2N picture block |
| --- | --- | --- |
| First layer | 1 | 1 |
| Second layer | 1 | 1 |

TABLE 5

| Division level | Division mode of an N × 2N picture block | Division mode of an nL × 2N picture block |
| --- | --- | --- |
| First layer | 1 | 1 |
| Second layer | 0.5 | 0.25 |

It should be noted that, the method for obtaining the size of the transform block provided by the embodiment may be applied to other embodiments, that is, the execution procedure of the step for obtaining the size of the transform block in other embodiments may adopt the technical solution provided by this embodiment.

Embodiment 5

The following embodiment of the present invention provides another picture encoding method, and the difference between the embodiment and the foregoing two embodiments mainly lies in that: the embodiment uses a layer-wise identification method by using a prediction block as a unit.

Steps 801 to 802 are the same as steps 601 to 602, which are not repeated herein.

Step 803: The picture encoding device determines a corresponding division level in the prediction block of the transform block corresponding to the prediction block, in which the size of the transform block corresponding to the first division level is the size of a smallest prediction block.

The specific implementation manner of the step is similar to that of step 603, which is not repeated herein.

Step 804: The picture encoding device determines the size of the transform blocks corresponding to the prediction block according to the division manner of the picture block and the determined division level.

For example, when the division manner corresponding to the picture block is N×2N division, the picture block is divided into two sub-picture blocks with the size of N×2N, and in this case, the size of the prediction block is N×2N. In this case, as shown in FIG. 8a, transform blocks corresponding to two prediction blocks are transform blocks of the first division layer, the size of the transform blocks adopted by the two prediction blocks is N×2N, and subsequently, division flags are separately set for the two prediction blocks to identify the use of the first division layer; as shown in FIG. 8b, in this case, the division layer of the transform block corresponding to the prediction block on the left of the picture block is still the first division layer, and the division layer of the transform block corresponding to the prediction block on the right is the second division layer, so the size of the transform block used by the left prediction block is still N×2N, and it is determined that the size of the transform block used by the right prediction block is N×N according to the division level (the second division layer) and the picture block division manner (N×2N), and subsequently, division flags of the left and right prediction blocks are separately set, and are respectively used for identifying that the left prediction block uses the first layer division and the right prediction block uses the second division layer; as shown in FIG. 8c, in this case, the division layer of the transform block corresponding to the prediction block on the left of the picture block is still the first division layer, and the division layer of the transform block corresponding to the prediction block on the right is the third division layer, so the size of the transform block used by the left prediction block is still N×2N, and the size of the transform block used by the right prediction block is determined to be 0.5N×0.5N according to the division level (the third division layer) and the picture block division manner (N×2N), and division flags of the left and right prediction blocks are separately set, and are respectively used for identifying that the left prediction block uses the first layer division and the right prediction block uses the third layer division.

Step 805: The picture encoding device determines the identification information for identifying the division level corresponding to the transform block corresponding to the prediction block.

Figure 8:
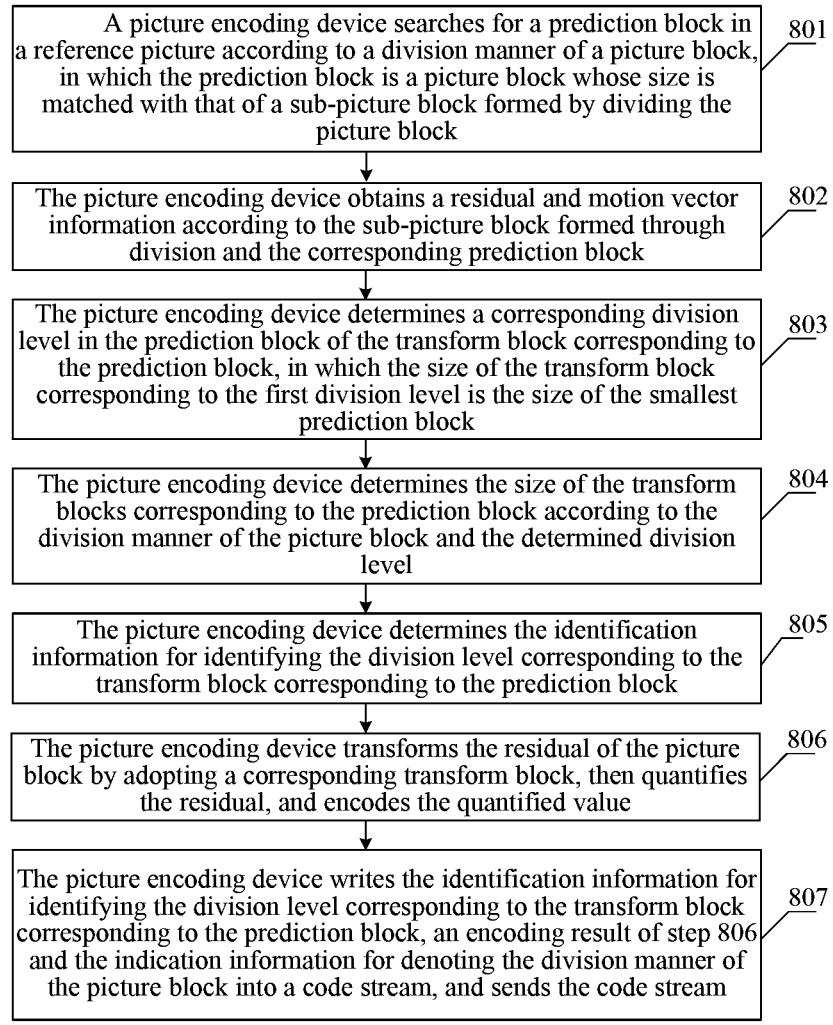
FIG. 8 is a flowchart of a picture encoding method according to embodiment 5 of the present invention.
Figure 8A:
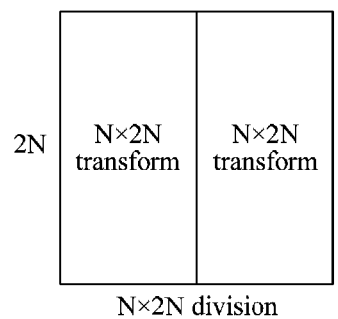
FIG. 8a is a schematic diagram showing that two prediction blocks correspond to an N×2N transform block.
Figure 8B:
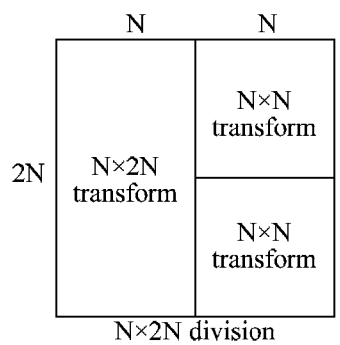
FIG. 8b is a schematic diagram showing that a left prediction block corresponds to an N×2N transform block and a right prediction block corresponds to an N×N transform block.
Figure 8C:
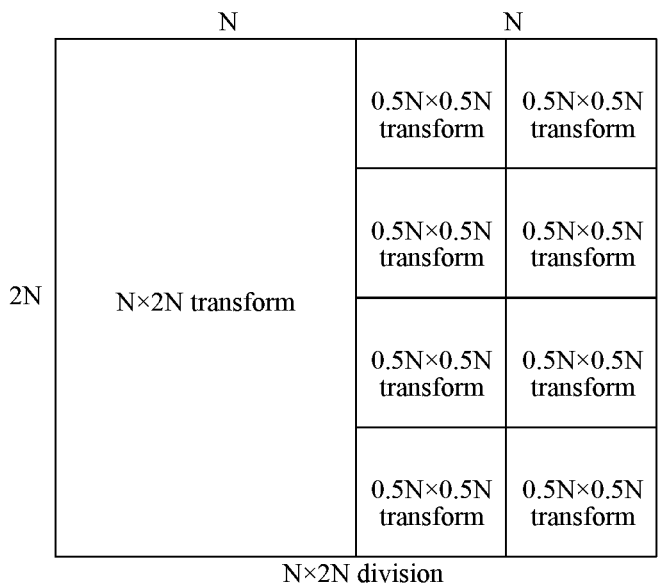
FIG. 8c is a schematic diagram showing that a left prediction block corresponds to an N×2N transform block and a right prediction block corresponds to a 0.5×0.5N transform block.

As shown in FIG. 8a, it is determined that the identification information for identifying the division level corresponding to the transform blocks corresponding to the left prediction block includes: one bit, in which a value of the bit is a first specified value, such as 1, which is used for indicating that the N×2N transform block corresponding to the first division layer is not further divided; it is determined that the identification information for identifying the division level corresponding to the transform blocks corresponding to the right prediction block includes: one bit, in which a value of the bit is a first specified value, which is used for indicating that the N×2N transform block corresponding to the first division layer is not further divided; as shown in FIG. 8b, the identification information for identifying the division level corresponding to the transform blocks corresponding to the left prediction block is the same as that in FIG. 8a, and it is determined that the identification information for identifying the division level corresponding to the transform blocks corresponding to the right prediction block includes: one bit, in which a value of the bit is a second specified value, which is used for indicating that the N×2N transform block corresponding to the first division layer is further divided; as shown in FIG. 8c, the identification information for identifying the division level corresponding to the transform blocks corresponding to the left prediction block is the same as that in FIG. 8a, and it is determined that the identification information for identifying the division level corresponding to the transform blocks corresponding to the right prediction block includes: two layers of indication information, in which a first layer of indication information includes one bit, and a value of the bit is a second specified value, which is used for indicating that the N×2N transform block corresponding to the first division layer is further divided, so as to obtain two transform blocks (with the size of N×N) of the second division layer; the second layer of indication information includes: two bits, which are used for indicating that two transform blocks of the second division layer are further divided, and in this way, it may be indicated that the right prediction block uses the obtained transform block of the third division layer.

Step 806: The picture encoding device transforms the residual of the picture block by adopting a corresponding transform block, then quantizes the residual, and encodes the quantized value.

Step 807: The picture encoding device writes the identification information for identifying the division level where the transform block corresponding to the prediction block is located, an encoding result of step 806 and the indication information for indicating the division manner of the picture block into a code stream, and sends the code stream.

In the embodiment of the present invention, when the size of the transform block corresponding to the prediction block is determined, the division manner of the picture block is taken into account, and the identification information for identifying the division level where the transform block corresponding to the prediction block is located is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Embodiment 6

Figure 9:
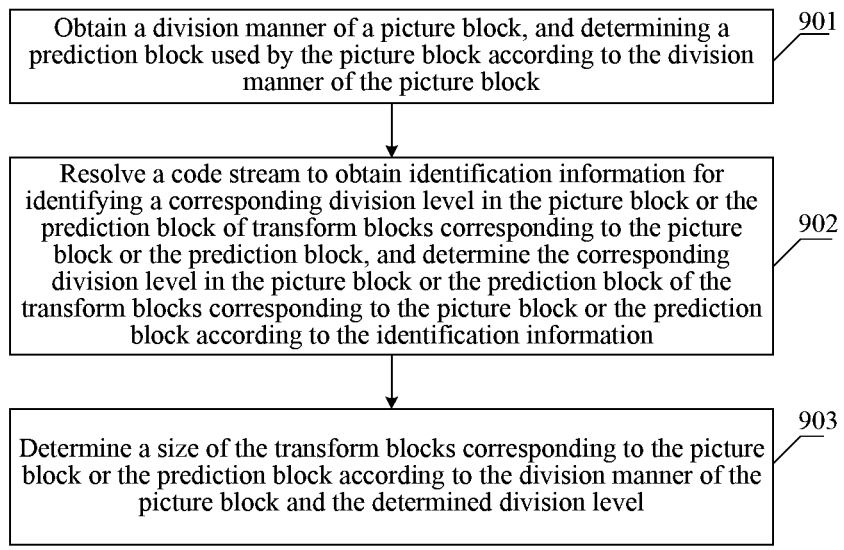
FIG. 9 is a flowchart of a picture decoding method according to embodiment 6 of the present invention.

Referring to FIG. 9, an embodiment of the present invention provides a picture decoding method, which specifically includes the following steps:

Step 901: Obtain a division manner of a picture block, and determining a prediction block used by the picture block according to the division manner of the picture block.

The execution subject of each step of the embodiment is a picture decoding device.

In the step, the picture decoding device obtains the division manner of the picture block from a code stream sent by a picture encoding device, that is, to resolve the code stream to obtain the division manner of the picture block. The division manner of the picture block may be classified into: a division manner of nL×2N and a division manner of 2N×nL, and for details, refer to the corresponding description of step 501, which is not repeated herein. The determining of the prediction block used by the picture block according to the division manner of the picture block in the step specifically includes: determining a size of the prediction block used by the picture block according to the division manner of the picture block.

Step 902: Resolve a code stream to obtain identification information for identifying a corresponding division level in the picture block or the prediction block of transform blocks corresponding to the picture block or the prediction block, and determine the corresponding division level in the picture block or the prediction block of the transform blocks corresponding to the picture block or the prediction block according to the identification information, in which, the transform blocks corresponding to the picture block or the prediction block include one or more transform blocks.

The step includes the following steps: when the identification information includes: an identifier used for indicating that a transform block corresponding to an $N^{th}$ division layer is not further divided, the picture decoding device determines, according to the identification information, that a corresponding division level in the picture block or the prediction block of at least one transform block corresponding to the picture block or the prediction block is the $N^{th}$ division layer; when the identification information includes: an identifier used for indicating that at least one transform block corresponding to the $N^{th}$ division layer is further divided, the picture decoding device determines, according to the identification information, that the corresponding division level in the picture block or the prediction block of at least one transform block corresponding to the picture block or the prediction block is greater than the $N^{th}$ division layer.

The specific procedure of determining the corresponding division level in the prediction block of the transform blocks corresponding to the prediction block according to the identification information includes:

reading indication information of the $N^{th}$ layer from the identification information, and judging whether a value of a bit in the indication information of the $N^{th}$ layer is a first specified value or a second specified value;

when the N is equal to M−1, if the value of the bit in the indication information of the $N^{th}$ layer is the first specified value, determining that the division level corresponding to the transform block corresponding to the bit is the $N^{th}$ division layer; if the value of the bit in the indication information of the $N^{th}$ layer is the second specified value, determining that the division level corresponding to the transform block corresponding to the bit is an $M^{th}$ division layer, in which, M is a predetermined division level or a predetermined division level corresponding to the smallest transform block, and N is greater than or equal to 1;

when the N is less than M−1, if the value of the bit in the indication information of the $N^{th}$ layer is the first specified value, determining that the division level corresponding to the transform block corresponding to the bit is the $N^{th}$ division layer; if the value of the bit in the indication information of the $N^{th}$ layer is the second specified value, continuing reading indication information of a next layer from the identification information until indication information of an $M-1^{th}$ layer is read or indication information of an $N+a^{th}$ layer whose bit values are all the first specified value is read, in which the N+a is less than or equal to M.

In the procedure of determining the corresponding division level in the prediction block of a transform block corresponding to the prediction block, when N is equal to 1, the number of bits in the indication information of the $N^{th}$ layer is the number of the smallest prediction blocks of the prediction block; or, in the procedure of determining the corresponding division level in the prediction block of a transform block corresponding to the picture block, when N is equal to 1, the number of the bit in the indication information of the first layer is one; when N is equal to 2, the number of bits in the indication information of the second layer is the number of the smallest prediction blocks in the picture block.

Step 903: Determine a size of the transform blocks corresponding to the picture block or the prediction block according to the division manner of the picture block and the determined division level.

The specific implementation procedure of the step is similar to the operation procedure of the picture encoding device, which is not repeated herein.

In the embodiment of the present invention, when the size of the transform block is determined, the division manner of the picture block is taken into account, and the identification information for identifying the division level corresponding to the transform blocks corresponding to the picture block or the prediction block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

In order to make the foregoing technical solution provided by the present invention clearer, the following two embodiments introduce the foregoing technical solution of the present invention in detail.

Embodiment 7

Figure 10:
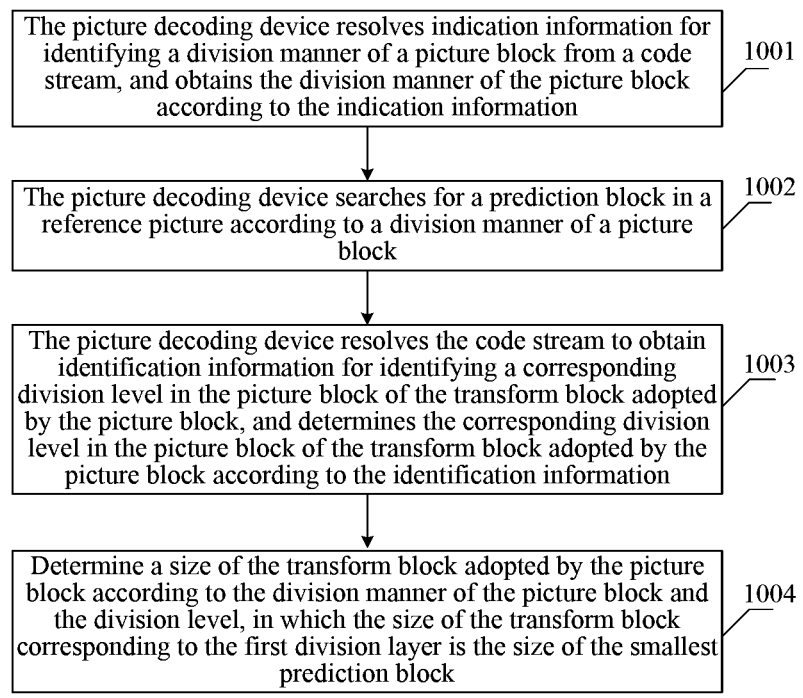
FIG. 10 is a flowchart of a picture decoding method according to embodiment 7 of the present invention.

Referring to FIG. 10, an embodiment of the present invention provides a picture decoding method, and the picture decoding method corresponds to the picture encoding method shown in FIG. 6, and specifically includes the following steps:

Step 1001: A picture decoding device resolves a code stream to obtain indication information for identifying a division manner of a picture block, and obtains the division manner of the picture block according to the indication information.

As described above, the division manner of the picture block may be an N×2N division manner, or an nL×2N division manner.

Step 1002: The picture decoding device searches for a prediction block in a reference picture according to the division manner of the picture block, in which the prediction block is a picture block whose size matches the size of a sub-picture block obtained by dividing the picture block.

Step 1003: The picture decoding device resolves the code stream to obtain identification information for identifying a corresponding division level in the picture block of the transform block adopted by the picture block, and determines the corresponding division level in the picture block of the transform block adopted by the picture block according to the identification information.

Step 1004: Determine a size of the transform block adopted by the picture block according to the division manner of the picture block and the division level, in which the size of the transform block corresponding to the first division layer is the size of a smallest prediction block.

Specifically, step 1003 and step 1004 include the following steps:

The picture decoding device, according to the division manner, determines the number of bits of first layer indication information in the identification information, that is, the number of the smallest prediction blocks in the picture block is the number of bits of the first layer indication information, and determines that the number of bits of the first layer indication information is 2 when the picture block division manner is N×2N, in which when the picture block division manner is nL×2N, if the picture block is divided into two sub-picture blocks of 0.5N×2N and 1.5N×2N, the number of bits of the first layer indication information is 4; determines that the division level corresponding to the current picture block is the first division layer when the first layer indication information identifies that the size of the transform block corresponding to the picture block is not divided into a smaller size, and determines that the size of the transform block corresponding to the picture block is N×2N when the picture block division manner is N×2N, that is, the size of the transform block corresponding to the first division layer is consistent with the size of the prediction block; determines that the size of the transform block is 0.5N×2N when the picture block division manner is nL×2N, that is, the size of the transform block corresponding to the first division layer is consistent with the size of the smallest prediction block of the prediction blocks. When the first layer indication information identifies that the size of some transform blocks of the first division layer is divided into a smaller size, in this case, the division level is increased by one on the basis of the current division level, that is, the division level is changed into the second division layer. When the picture block division manner is N×2N, it is determined that the size of the transform block of the second division layer corresponding to the picture block is N×N, that is, the horizontal size corresponding to a transform block of a next layer is the same as the horizontal size of the transform block corresponding to a current layer, and the vertical size corresponding to the transform block of the next layer is one half of the vertical size of the transform block corresponding to the current layer, as shown in FIG. 6b; when the picture block division manner is nL×2N, it is determined that the size of the transform block of a next layer is 0.5N×0.5N, that is, the horizontal size corresponding to the transform block of the next layer is the same as the horizontal size of the transform block corresponding to a current layer, and the vertical size corresponding to the transform block of the next layer is one fourth of the vertical size of the transform block corresponding to the current layer, as shown in FIG. 6d.

The encoding and decoding device may predetermine a division level allowed under a certain division manner or the encoding and decoding device predetermines the smallest transform size allowed under a certain division manner, and the specific implementation manner is the same as that for an encoding end, which is not repeated herein. Specifically, the manner of determining the size of the transform block adopted by the picture block according to the division manner of the picture block and the division level is the same as the method of the aforementioned embodiment 4, which is not repeated herein.

In the embodiment of the present invention, when the size of the transform block adopted by the picture block is determined, the division manner of the picture block is taken into account, and the identification information for identifying the division level corresponding to the transform block adopted by the picture block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Embodiment 8

Figure 11:
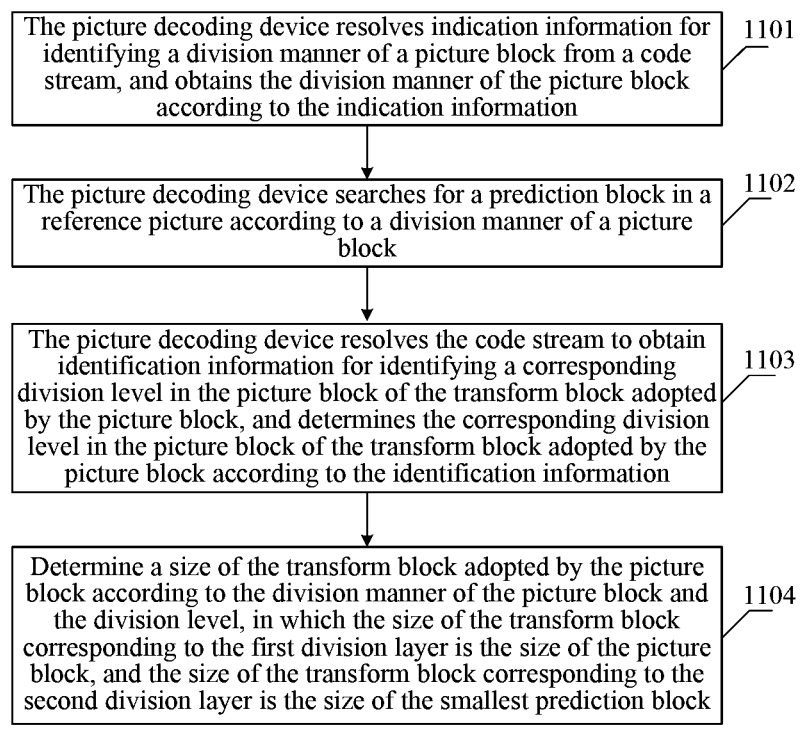
FIG. 11 is a flowchart of a picture decoding method according to embodiment 8 of the present invention.

Referring to FIG. 11, an embodiment of the present invention provides a picture decoding method, and the picture decoding method corresponds to the picture encoding method shown in FIG. 7, and specifically includes the following steps:

Steps 1111 to 1102 are the same as steps 1001 to 1002, which are not repeated herein.

Step 1113: The picture decoding device resolves the code stream to obtain identification information for identifying a division level of the transform block adopted by the picture block, and determines the corresponding division level in the picture block of the transform block adopted by the picture block according to the identification information.

Specifically, first layer indication information is obtained from the identification information for identifying the division level of the transform block corresponding to the prediction block of the picture block, the first layer indication information includes a bit, that is, a first bit is obtained, and it is determined, according to the value of the first bit, whether the first division layer is further divided, if the value of the first bit indicates that the first division layer is not further divided, it is determined that the transform block corresponding to the picture block is one transform block, that is, an 2N×2N transform block; if the value of the first bit indicates that the first division layer is further divided, the number of bits of second layer indication information in the identification information is determined according to the size of the smallest prediction block of prediction blocks of the picture block, for example, if the division manner is 0.5N×2N, the size of the smallest prediction block is also 0.5N×2N, and the picture block with the size of 2N×2N corresponds to four transform blocks with the size the same as the size of the smallest prediction block, so it is determined that the number of bits of the second layer indication information is four, and these four bits are read; if the bit value is a first specified value, such as 1, it indicates that the transform block of the second division layer is not further divided, and if the bit value is a second specified value, such as 0, it indicates that the transform block of the second division layer needs to be further divided. For the drawing shown in FIG. 7b, these four bits are all the first specified value, and in this case, it is determined that the corresponding division level in the picture block of the transform block adopted by the picture block is the second division layer, that is, it is determined that each transform block adopted by the picture block is the transform block of the second division layer. For the drawing shown in FIG. 7c, the second bit and the third bit of these four bits are the first specified value, which indicates that transform blocks corresponding to the second bit and the third bit of the second division layer do not need to be further divided, and it is determined that the division level of the transform blocks corresponding to the second bit and the third bit of these four bits adopted by the picture block is the second division layer; the first bit and the fourth bit are the second specified value, which indicates that transform blocks corresponding to the first bit and the fourth bit of the second division layer need to be further divided, so as to obtain four transform blocks of a third division layer, in this case, when the most division level allowed under the division manner is 3, or the smallest transform block size allowed under the division manner is 0.5N×0.5N, it is determined that the picture block needs to correspond to transform blocks obtained by further dividing the transform blocks corresponding to the first bit and the fourth bit of the four bits, the division level corresponding to the obtained transform blocks is the third division layer.

Step 1104: Determine a size of the transform block adopted by the picture block according to the division manner of the picture block and the division level. The size of the transform block corresponding to the first division layer is the size of the picture block, that is, 2N×2N; the size of the transform block corresponding to the second division layer is the size of the smallest prediction block.

When the division level corresponding to the picture block is the first division layer, and if the picture block division manner is nL×2N, it is determined that the size of the transform block corresponding to the picture block is 2N×2N, that is, the size of the transform block corresponding to the first division layer is consistent with that of the picture block, as shown in FIG. 7a); when the division level corresponding to the picture block is the second division layer, and the picture block division manner is nL×2N, it is determined, according to the division manner of the picture block and the division level (that is, the second division layer) that, the size of the transform block corresponding to the picture block is 0.5N×2N, that is, the size of the transform block corresponding to the second division layer is consistent with the size of the smallest prediction block of the prediction blocks, as shown in FIG. 7b); when a 0.5×2N data block in the picture block needs to adopt the transform block of the third division layer, it is determined, according to the division manner of the picture block and the division level (that is, the third division layer) that, the size of the transform block adopted by the picture block is 0.5N×0.5N, that is, the horizontal size corresponding to a transform block of a next layer is the same as the horizontal size of the transform block corresponding to the current layer, and the vertical size corresponding to the transform block of the next layer is one fourth of the vertical size of the transform block corresponding to the current layer, as shown in FIG. 7c).

Specifically, the manner of determining the size of the corresponding transform block adopted by the picture block according to the division manner of the picture block and the division level is the same as the method of the aforementioned embodiment 4, which is not repeated herein.

In the embodiment of the present invention, when the size of the transform block adopted by the picture block is determined, the division manner of the picture block is taken into account, and the identification information for identifying the division level of the transform block adopted by the picture block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Accordingly, an embodiment of the present invention provides a picture decoding method, which corresponds to the picture encoding method shown in FIG. 7. A picture decoding device separately resolves division flags (that is, identification information for identifying a division level corresponding to a transform block corresponding to a prediction block) corresponding to two prediction blocks, separately determines division levels corresponding to transform blocks corresponding to the two prediction blocks according to the division flags of the two prediction blocks, and determines the size of the transform blocks corresponding to the two prediction blocks according to the division manner of the picture block and the determined division level separately.

It should be noted that, each of the foregoing embodiments is described by taking the division manner of nL×2N as an example, and it should be understood that, the technical solution provided by each of the foregoing embodiments of the present invention is also applicable to division manners such as nR×N, 2N×nU, 2N×nD, 2N×N, and N×2N.

Figure 12:
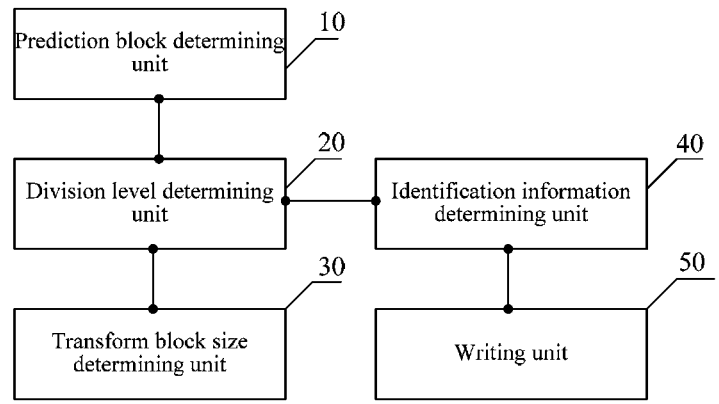
FIG. 12 is a structural diagram of a picture encoding device according to an embodiment of the present invention.

Referring to FIG. 12, an embodiment of the present invention provides a picture encoding device, which includes:

a prediction block determining unit 10, configured to determine a prediction block used by a picture block according to a division manner of the picture block;

a division level determining unit 20, configured to determine a corresponding division level in the picture block or the prediction block of transform blocks corresponding to the picture block or the prediction block, in which, the transform blocks corresponding to the picture block or the prediction block include one or more transform blocks;

a transform block size determining unit 30, configured to determine a size of the transform blocks corresponding to the picture block or the prediction block according to the division manner of the picture block and the division level;

an identification information determining unit 40, configured to determine identification information for identifying the division level corresponding to the transform blocks corresponding to the picture block or the prediction block; and a writing unit 50, configured to write the identification information into a code stream.

For the relationship between the size of the transform block corresponding to an upper level division layer and the size of the transform block corresponding to a lower level division layer (such as, the relationship between the size of the transform block corresponding to an $N^{th}$ division layer and the size of the transform block corresponding to the $N+1^{th}$ division layer, in which, the $N^{th}$ division layer is the upper level division layer of the $N+1^{th}$ division layer, and the $N+1^{th}$ division layer is the lower level division layer of the $N^{th}$ division layer), and the specification for the size of the transform block corresponding to a division layer, refer to the corresponding description of the method embodiment, which are not repeated herein.

The division level determining unit 20 is configured to, when a corresponding division level in the picture block or the prediction block of at least one transform block corresponding to the picture block or the prediction block is the $N^{th}$ division layer, determine that the identification information for identifying the division level corresponding to the at least one transform block corresponding to the picture block or the prediction block includes: a flag bit identifying that the at least one transform block of the $N^{th}$ division layer is not further divided; or, the division level determining unit 20 is configured to, when a corresponding division level in the picture block or the prediction block of at least one transform block corresponding to the picture block or the prediction block is greater than the $N^{th}$ division layer, determine that the identification information for identifying the division level corresponding to the at least one transform block corresponding to the picture block or the prediction block includes: a flag bit for identifying that a transform block corresponding to the $N^{th}$ division layer is further divided.

The transform block size determining unit 30 is configured to query the division manner of the picture block and the size of the transform block corresponding to the division level, in which, the specific mapping may be shown in Table 1.

Or, the transform block size determining unit 30 is configured to query the division manner of the picture block and a first type of size ratio corresponding to the division level, in which, the first type of size ratio includes: a ratio of a horizontal size of the transform blocks corresponding to the picture block or the prediction block to a horizontal size of the picture block and a ratio of a vertical size of the transform blocks corresponding to the picture block or the prediction block to a vertical size of the picture block; and determine the size of the transform blocks corresponding to the picture block or the prediction block according to the first type of size ratio and the horizontal size and the vertical size of the picture block, in which, the specific mapping may be shown in Table 2 and Table 3.

Or, the transform block size determining unit 30 is configured to query the division manner of the picture block and a second type of size ratio corresponding to the division level, in which, the second type of size ratio includes: a ratio of the horizontal size of the transform blocks corresponding to the picture block or the prediction block to a horizontal size of the prediction block and a ratio of the vertical size of the transform blocks corresponding to the picture block or the prediction block to a vertical size of the prediction block; determine the size of the transform blocks corresponding to the picture block or the prediction block according to the second type of size ratio and the horizontal size and the vertical size of the prediction block, in which, the second type of size ratio specifically may include: a ratio of a horizontal size of the transform blocks corresponding to the picture block or the prediction block to a horizontal size of the smallest prediction block and a ratio of a vertical size of the transform blocks corresponding to the picture block or the prediction block to a vertical size of the smallest prediction block; and then determine the size of the transform block corresponding to the picture block or the prediction block according to the determined second type of size ratio and the size of the smallest prediction block. The specific mapping may be shown in Table 4 and Table 5.

In the embodiment of the present invention, when the size of the transform block is determined, the division manner of the picture block is taken into account, and the identification information for identifying the division level corresponding to the transform blocks corresponding to the picture block or the prediction block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding efficiency.

Figure 13:
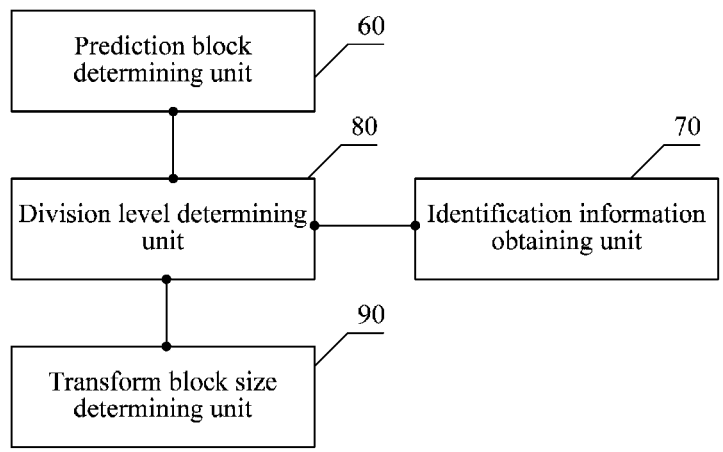
FIG. 13 is a structural diagram of a picture decoding device according to an embodiment of the present invention.

Referring to FIG. 13, an embodiment of the present invention provides a picture decoding device, which includes:

a prediction block determining unit 60, configured to obtain a division manner of a picture block, and determine a prediction block used by the picture block according to the division manner of the picture block;

an identification information obtaining unit 70, configured to resolve a code stream to obtain identification information for identifying a corresponding division level in the picture block or the prediction block of transform blocks corresponding to the picture block or the prediction block;

a division level determining unit 80, configured to determine the corresponding division level in the picture block or the prediction block of the transform blocks corresponding to the picture block or the prediction block according to the identification information, in which, the transform blocks corresponding to the picture block or the prediction block include one or more transform blocks; and a transform block size determining unit 90, configured to determine a size of the transform blocks corresponding to the picture block or the prediction block according to the division manner of the picture block and the division level.

For the relationship between the size of the transform block corresponding to an upper level division layer and the size of the transform block corresponding to a lower level division layer, and the specification for the size of the transform block corresponding to a division layer, refer to the corresponding description of the method embodiment, which are not repeated herein.

The identification information includes: an identifier used for indicating that a transform block corresponding to an $N^{th}$ division layer is not further divided; and in this case, the division level determining unit is configured to determine, according to the identification information, that the corresponding division level in the picture block or the prediction block of at least one transform block of the transform blocks corresponding to the picture block or the prediction block is the $N^{th}$ division layer; or, the identification information includes: an identifier used for indicating that at least one transform block corresponding to the $N^{th}$ division layer is further divided; and the division level determining unit is configured to determine, according to the identification information, that the corresponding division level in the picture block or the prediction block of at least one transform block of the transform blocks corresponding to the picture block or the prediction block is greater than the $N^{th}$ division layer.

The structure and the function of the transform block size determining unit 90 are similar to the structure and the function of the transform block size determining unit 30 in the foregoing picture encoding device, which are not repeated herein.

In the embodiment of the present invention, when the size of the transform block is determined, the division manner of the picture block is taken into account, and the identification information for identifying the division level corresponding to the transform blocks corresponding to the picture block or the prediction block is written into the code stream, so that a layer-wise identifying method is used to identify the size of the transform block, thereby not only ensuring that the transform block does not cross the boundary of the prediction block, but also effectively identifying the size of the transform block, so as to effectively improve the encoding and decoding efficiency.

An embodiment of the present invention provides a network system, which includes a picture encoding device and a picture decoding device, in which, the structure and the function of the picture encoding device are the same as those of the embodiment shown in FIG. 12; the structure and the function of the picture decoding device are the same as those of the embodiment shown in FIG. 13, which are not repeated herein.

Persons of ordinary skill in the art may understand that all or part of the steps of the method according to the embodiments of the present invention may be implemented by a program instructing relevant hardware. The program may be stored in a computer readable storage medium, such as a read-only memory, a magnetic disk or an optical disk.

The picture encoding and decoding method, the encoding and decoding device and the network system according to the embodiments of the present invention are introduced in detail above. Specific cases are used for illustrating principles and implementation manners of the present invention. The above descriptions of the embodiments are merely for understanding the method and core ideas of the present invention. Meanwhile, persons of ordinary skill in the art may make modifications to the specific implementation manners and application ranges according to the idea of the present invention. In conclusion, the content of the specification shall not be regarded as a limitation to the present invention.

What is claimed is:

1. A picture encoding method, comprising:
   determining a prediction block used by a picture block according to a division manner of the picture block;
   determining a corresponding division level in the picture block or the prediction block of a transform block corresponding to the picture block or the prediction block;
   determining a size of the transform block corresponding to the picture block or the prediction block according to the division manner of the picture block and the division level;
   determining identification information for identifying the division level corresponding to the transform block corresponding to the picture block or the prediction block; and
   writing the identification information into a code stream.

2. The method according to claim 1, wherein
   the determining the prediction block used by the picture block according to the division manner of the picture block comprises:
   determining a size of the prediction block used by the picture block according to the division manner of the picture block.

3. The method according to claim 1, wherein
   the determining the identification information for identifying the division level corresponding to the transform block corresponding to the picture block or the prediction block comprises:
   when a corresponding division level in the picture block or the prediction block of the transform block corresponding to the picture block or the prediction block is an $N^{th}$ division layer, determining the identification information for identifying the division level corresponding to the at least one transform block corresponding to the picture block or the prediction block comprises: determining a flag bit identifying that the at least one transform block of the $N^{th}$ division layer is not further divided.

4. The method according to claim 1, wherein
   the determining the identification information for identifying the division level corresponding to the transform block corresponding to the picture block or the prediction block comprises:
   when a corresponding division level in the picture block or the prediction block of at least one transform block corresponding to the picture block or the prediction block is greater than an $N^{th}$ division layer, determining the identification information for identifying the division level corresponding to the at least one transform block corresponding to the picture block or the prediction block comprises: determining a flag bit for identifying that a transform block corresponding to the $N^{th}$ division layer is further divided.

5. The method according to claim 1, wherein
   when a corresponding division level in the prediction block of a transform block corresponding to the prediction block is a particular division layer, a size of the transform block determined according to the division manner of the picture block and the particular division layer is a size of a smallest prediction block, wherein, the smallest prediction block is a prediction block with a smallest size of prediction blocks used by the determined picture block.

6. The method according to claim 1, wherein
   when a corresponding division level in the picture block of a transform block corresponding to the picture block is a first particular division layer, a size of the transform block determined according to the division manner of the picture block and the first particular division layer is a size of the picture block; and
   when the corresponding division level in the picture block of the transform block corresponding to the picture block is a second particular division layer, a size of the transform block determined according to the division manner of the picture block and the second particular division layer is a size of a smallest prediction block, wherein, the smallest prediction block is a prediction block with a smallest size of prediction blocks used by the determined picture block.

7. The method according to claim 1, wherein
   when the corresponding division level of the at least one transform block corresponding to the picture block or the prediction block is an $N+1^{th}$ division layer, a horizontal size of the at least one transform block is less than a horizontal size of a transform block corresponding to an $N^{th}$ division layer; and/or a vertical size of the at least one transform block is less than a vertical size of the transform block corresponding to the $N^{th}$ division layer.

8. The method according to claim 7, wherein
   that the horizontal size of the at least one transform block is less than the horizontal size of the transform block corresponding to the $N^{th}$ division layer is that:
   the horizontal size of the at least one transform block is $1/m_1$ of the horizontal size of the transform block corresponding to the $N^{th}$ division layer, wherein, $m_1$ is greater than or equal to 2.

9. The method according to claim 7, wherein
   that the vertical size of the at least one transform block is less than the vertical size of the transform block corresponding to the $N^{th}$ division layer is that:
   the vertical size of the at least one transform block is $1/m_2$ of the vertical size of the transform block corresponding to the $N^{th}$ division layer, wherein, $m_2$ is greater than or equal to 2.

10. The method according to claim 1, wherein
    the determining the size of the transform block corresponding to the picture block or the prediction block according to the division manner of the picture block and the division level comprises:
    querying the division manner of the picture block and the size of the transform block corresponding to the division level;
    or,
    querying the division manner of the picture block and a first type of size ratio corresponding to the division level, wherein, the first type of size ratio comprises: a ratio of a horizontal size of the transform block corresponding to the picture block or the prediction block to a horizontal size of the picture block and a ratio of a vertical size of the transform block corresponding to the picture block or the prediction block to a vertical size of the picture block; and
    determining the size of the transform block corresponding to the picture block or the prediction block according to the first type of size ratio and the horizontal size and the vertical size of the picture block;
    or,
    querying the division manner of the picture block and a second type of size ratio corresponding to the division level, wherein, the second type of size ratio comprises: a ratio of the horizontal size of the transform block corresponding to the picture block or the prediction block to a horizontal size of the prediction block and a ratio of the vertical size of the transform block corresponding to the picture block or the prediction block to a vertical size of the prediction block; and determining the size of the transform block corresponding to the picture block or the prediction block according to the second type of size ratio and the horizontal size and the vertical size of the prediction block.

11. A picture decoding method, comprising:

obtaining a division manner of a picture block, and determining a prediction block used by the picture block according to the division manner of the picture block;

resolving a code stream to obtain identification information for identifying a corresponding division level in the picture block or the prediction block of a transform block corresponding to the picture block or the prediction block, and determining the corresponding division level in the picture block or the prediction block of the transform block corresponding to the picture block or the prediction block according to the identification information; and determining a size of the transform blocks corresponding to the picture block or the prediction block according to the division manner of the picture block and the division level.

12. The method according to claim 11, wherein the determining the prediction block used by the picture block according to the division manner of the picture block comprises:

determining a size of the prediction block used by the picture block according to the division manner of the picture block.

13. The method according to claim 11, wherein the identification information comprises: an identifier used for indicating that a transform block corresponding to an $N^{th}$ division layer is not further divided; and the determining the corresponding division level in the picture block or the prediction block of the transform block corresponding to the picture block or the prediction block according to the identification information comprises:

determining, according to the identification information, that a corresponding division level in the picture block or the prediction block of at least one transform block of the transform block corresponding to the picture block or the prediction block is an $N^{th}$ division layer.

14. The method according to claim 11, wherein the identification information comprises: an identifier used for indicating that at least one transform block corresponding to an $N^{th}$ division layer is further divided; and the determining the corresponding division level in the picture block or the prediction block of the transform block corresponding to the picture block or the prediction block according to the identification information comprises:

determining, according to the identification information, that a corresponding division level in the picture block or the prediction block of at least one transform block of the transform block corresponding to the picture block or the prediction block is greater than the $N^{th}$ division layer.

15. The method according to claim 11, wherein when a corresponding division level in the prediction block of a transform block corresponding to the prediction block is a particular division layer, a size of the transform block determined according to the division manner of the picture block and the particular division layer is a size of a smallest prediction block, wherein, the smallest prediction block is a prediction block with a smallest size of prediction blocks used by the determined picture block.

16. The method according to claim 11, wherein when a corresponding division level in the picture block of a transform block corresponding to the picture block is a first particular division layer, a size of the transform block determined according to the division manner of the picture block and the first particular division layer is a size of the picture block; and when the corresponding division level in the picture block of the transform block corresponding to the picture block is a second particular division layer, a size of the transform block determined according to the division manner of the picture block and the second particular division layer is a size of a smallest prediction block, wherein, the smallest prediction block is a prediction block with a smallest size of prediction blocks used by the determined picture block.

17. The method according to claim 11, wherein when a corresponding division level in the picture block or the prediction block of at least one transform block of the transform block corresponding to the picture block or the prediction block is an $N+1^{th}$ division layer, a horizontal size of the at least one transform block is less than a horizontal size of a transform block corresponding to an $N^{th}$ division layer; and/or a vertical size of the at least one transform block is less than a vertical size of the transform block corresponding to the $N^{th}$ division layer.

18. The method according to claim 17, wherein that the horizontal size of the at least one transform block is less than the horizontal size of the transform block corresponding to the $N^{th}$ division layer is that:

the horizontal size of the at least one transform block is $1/m_1$ of the horizontal size of the transform block corresponding to the $N^{th}$ division layer, wherein, $m_1$ is greater than or equal to 2.

19. The method according to claim 17, wherein that the vertical size of the at least one transform block is less than the vertical size of the transform block corresponding to the $N^{th}$ division layer is that:

the vertical size of the at least one transform block is $1/m_2$ of the vertical size of the transform block corresponding to the $N^{th}$ division layer, wherein, $m_2$ is greater than or equal to 2.

20. The method according to claim 11, wherein the determining the size of the transform block corresponding to the picture block or the prediction block according to the division manner of the picture block and the division level comprises:

querying the division manner of the picture block and the size of the transform block corresponding to the division level;

or, querying the division manner of the picture block and a first type of size ratio corresponding to the division level, wherein, the first type of size ratio comprises: a ratio of a horizontal size of the transform block corresponding to the picture block or the prediction block to a horizontal size of the picture block and a ratio of a vertical size of the transform block corresponding to the picture block or the prediction block to a vertical size of the picture block; and determining the size of the transform block corresponding to the picture block or the prediction block according to the first type of size ratio and the horizontal size and the vertical size of the picture block;

or, querying the division manner of the picture block and a second type of size ratio corresponding to the division level, wherein, the second type of size ratio comprises: a ratio of the horizontal size of the transform block corresponding to the picture block or the prediction block to a horizontal size of the prediction block and a ratio of the vertical size of the transform block corresponding to the picture block or the prediction block to a vertical size of the prediction block; and determining the size of the transform block corresponding to the picture block or the prediction block according to the second type of size ratio and the horizontal size and the vertical size of the prediction block.

21. A picture encoding device, comprising:

a prediction block determining unit, configured to determine a prediction block used by a picture block according to a division manner of the picture block;

a division level determining unit, configured to determine a corresponding division level in the picture block or the prediction block of a transform block corresponding to the picture block or the prediction block, wherein, the transform block corresponding to the picture block or the prediction block comprise one or more transform blocks;

a transform block size determining unit, configured to determine a size of the transform block corresponding to the picture block or the prediction block according to the division manner of the picture block and the division level;

an identification information determining unit, configured to determine identification information for identifying the division level corresponding to the transform block corresponding to the picture block or the prediction block; and a writing unit, configured to write the identification information into a code stream.

22. The device according to claim 21, wherein the division level determining unit is configured to, when a corresponding division level in the picture block or the prediction block of at least one transform block corresponding to the picture block or the prediction block is an $N^{th}$ division layer, determine that identification information for identifying the division level corresponding to the at least one transform block corresponding to the picture block or the prediction block comprises: a flag bit identifying that the at least one transform block of the $N^{th}$ division layer is not further divided;

or, the division level determining unit is configured to, when a corresponding division level in the picture block or the prediction block of at least one transform block corresponding to the picture block or the prediction block is greater than an $N^{th}$ division layer, determine that identification information for identifying the division level corresponding to the at least one transform block corresponding to the picture block or the prediction block comprises: a flag bit for identifying that a transform block corresponding to the $N^{th}$ division layer is further divided.

23. The device according to claim 21, wherein when a corresponding division level in the prediction block of a transform block corresponding to the prediction block is a particular division layer, a size of the transform block determined according to the division manner of the picture block and the particular division layer is a size of a smallest prediction block, wherein, the smallest prediction block is a prediction block with a smallest size of prediction blocks used by the determined picture block.

24. The device according to claim 21, wherein when a corresponding division level in the picture block of a transform block corresponding to the picture block is a first particular division layer, a size of the transform block determined according to the division manner of the picture block and the first particular division layer is a size of the picture block; and when the corresponding division level in the picture block of the transform block corresponding to the picture block is a second particular division layer, a size of the transform block determined according to the division manner of the picture block and the second particular division layer is a size of a smallest prediction block, wherein, the smallest prediction block is a prediction block with a smallest size of prediction blocks used by the determined picture block.

25. The device according to claim 21, wherein the transform block size determining unit is configured to query the division manner of the picture block and the size of the transform block corresponding to the division level;

or, the transform block size determining unit is configured to query the division manner of the picture block and a first type of size ratio corresponding to the division level, wherein, the first type of size ratio comprises: a ratio of a horizontal size of the transform block corresponding to the picture block or the prediction block to a horizontal size of the picture block and a ratio of a vertical size of the transform block corresponding to the picture block or the prediction block to a vertical size of the picture block; and determine the size of the transform block corresponding to the picture block or the prediction block according to the first type of size ratio and the horizontal size and the vertical size of the picture block;

or, the transform block size determining unit is configured to query the division manner of the picture block and a second type of size ratio corresponding to the division level, wherein, the second type of size ratio comprises: a ratio of the horizontal size of the transform block corresponding to the picture block or the prediction block to a horizontal size of the prediction block and a ratio of the vertical size of the transform block corresponding to the picture block or the prediction block to a vertical size of the prediction block; and determine the size of the transform block corresponding to the picture block or the prediction block according to the second type of size ratio and the horizontal size and the vertical size of the prediction block.

26. A picture decoding device, comprising:

a prediction block determining unit, configured to obtain a division manner of a picture block, and determining a prediction block used by the picture block according to the division manner of the picture block;

an identification information obtaining unit, configured to resolve a code stream to obtain identification information for identifying a corresponding division level in the picture block or the prediction block of a transform block corresponding to the picture block or the prediction block;

a division level determining unit, configured to determine the corresponding division level in the picture block or the prediction block of the transform block corresponding to the picture block or the prediction block according to the identification information, wherein, the transform block corresponding to the picture block or the prediction block comprise one or more transform block; and a transform block size determining unit, configured to determine a size of the transform block corresponding to the picture block or the prediction block according to the division manner of the picture block and the division level.

27. The device according to claim 26, wherein the identification information comprises: an identifier used for indicating that a transform block corresponding to an $N^{th}$ division layer is not further divided; and the division level determining unit is configured to determine, according to the identification information, that the corresponding division level in the picture block or the prediction block of at least one transform block of the transform block corresponding to the picture block or the prediction block is the $N^{th}$ division layer;

or, the identification information comprises: an identifier used for indicating that at least one transform block corresponding to the $N^{th}$ division layer is further divided; and the division level determining unit is configured to determine, according to the identification information, that the corresponding division level in the picture block or the prediction block of at least one transform block of the transform block corresponding to the picture block or the prediction block is greater than the $N^{th}$ division layer.

28. The device according to claim 26, wherein when a corresponding division level in the prediction block of a transform block corresponding to the prediction block is a particular division layer, a size of the transform block determined according to the division manner of the picture block and the particular division layer is a size of a smallest prediction block, wherein, the smallest prediction block is a prediction block with a smallest size of prediction blocks of the determined picture block.

29. The device according to claim 26, wherein when a corresponding division level in the picture block of a transform block corresponding to the picture block is a first particular division layer, a size of the transform block determined according to the division manner of the picture block and the first particular division layer is a size of the picture block; and when the corresponding division level in the picture block of the transform block corresponding to the picture block is a second particular division layer, a size of the transform block determined according to the division manner of the picture block and the second particular division layer is a size of a smallest prediction block, wherein, the smallest prediction block is a prediction block with a smallest size of prediction blocks of the determined picture block.

30. The device according to claim 26, wherein the transform block size determining unit is configured to query the division manner of the picture block and the size of the transform block corresponding to the division level;

or, the transform block size determining unit is configured to query the division manner of the picture block and a first type of size ratio corresponding to the division level, wherein, the first type of size ratio comprises: a ratio of a horizontal size of the transform block corresponding to the picture block or the prediction block to a horizontal size of the picture block and a ratio of a vertical size of the transform block corresponding to the picture block or the prediction block to a vertical size of the picture block; and determine the size of the transform block corresponding to the picture block or the prediction block according to the first type of size ratio and the horizontal size and the vertical size of the picture block;

or, the transform block size determining unit is configured to query the division manner of the picture block and a second type of size ratio corresponding to the division level, wherein, the second type of size ratio comprises: a ratio of the horizontal size of the transform block corresponding to the picture block or the prediction block to a horizontal size of the prediction block and a ratio of the vertical size of the transform block corresponding to the picture block or the prediction block to a vertical size of the prediction block; and determine the size of the transform block corresponding to the picture block or the prediction block according to the second type of size ratio and the horizontal size and the vertical size of the prediction block.

* * * * *